US012327452B2

(12) United States Patent
Hollman et al.

(10) Patent No.: US 12,327,452 B2

(45) Date of Patent: Jun. 10, 2025

(54) UNIVERSAL RETROFIT OF CONTROLLED LOCKING ACCESS IN A LOCKER SOLUTION METHOD AND SYSTEM

(71) Applicant: Hollman Inc., Irving, TX (US)

(72) Inventors: Travis Hollman, Dallas, TX (US); Rajat Agarwal, Irving, TX (US)

(73) Assignee: HOLLMAN, INC., Irving, TX (US)

( * ) Notice: Subject to any disclaimer, the term of this patent is extended or adjusted under 35 U.S.C. 154(b) by 115 days.

(21) Appl. No.: 18/244,877

(22) Filed: Sep. 11, 2023

(65) Prior Publication Data

US 2024/0371221 A1 Nov. 7, 2024

Related U.S. Application Data

(60) Provisional application No. 63/464,099, filed on May 4, 2023, provisional application No. 63/463,665, filed on May 3, 2023.

(51) Int. Cl.
*G07C 9/00* (2020.01)

(52) U.S. Cl.
CPC ..... *G07C 9/00912* (2013.01); *G07C 9/00571* (2013.01); *G07C 2009/00769* (2013.01); *G07C 2209/63* (2013.01)

(58) Field of Classification Search
None
See application file for complete search history.

(56) References Cited

FOREIGN PATENT DOCUMENTS

WO WO-2021191335 A1 * 9/2021 ............ B65D 81/18

* cited by examiner

*Primary Examiner* — K. Wong

(74) *Attorney, Agent, or Firm* — Hemingway & Hansen, LLP; D. Scott Hemingway; Elizabeth P. Hartman

(57) ABSTRACT

The present invention is a system of retrofitting existing locker compartments with newer technology electronic locking devices that can provide controlled secure access to the compartments. The disclosed wireway lock mount supports the locking device and secures the lock wiring inside of the existing compartments. The locking devices are wired into the controlled secure access system for providing access to the compartments.

20 Claims, 18 Drawing Sheets

UNIVERSAL RETROFIT OF CONTROLLED LOCKING ACCESS IN A LOCKER SOLUTION METHOD AND SYSTEM

CROSS REFERENCE TO RELATED APPLICATIONS

This application claims the benefit of U.S. Provisional Application Nos. 63/463,665 filed May 3, 2023, and 63/464,099, filed May 4, 2023, which are incorporated by reference into this utility patent application.

STATEMENT REGARDING FEDERALLY SPONSORED RESEARCH OR DEVELOPMENT

Not applicable.

TECHNICAL FIELD OF INVENTION

This invention relates to the field of retrofit of newer technology controlled locking devices into existing locker compartments.

BACKGROUND OF THE INVENTION

A locker is a compartment, cabinet, or closet used to securely contain items. The size and shape of the lockers depends on the items to be stored. The size of the locker structures and compartments can range from small cubes for holding a few personal items (e.g., jacket, keys, and wallets), up to closet-sized compartments meant to hold larger items (e.g., clothes, pieces of luggage).

Lockers are located frequently in areas where large numbers of people gather or congregate (e.g., schools, gymnasiums, sports venues, hospitals, warehouses, offices) or where groups of people have personal items that need to be stored on a short-term basis (e.g., train stations, airports). Typically, lockers are arranged in vertical columns and adjacent rows, such that more than one locker is placed on top of one another in a vertical column and/or the columns are arranged in adjacent rows of lockers lined up in a side by side. The arranged layout of the lockers is designed to provide the most efficient storage space for any specific location.

Traditional locker structures and compartments have historically been locked using either external or internal locking means. These types of external locks include key locks, combination locks, or mechanical keypad locks, with most external locks being opened (and closed) by inserting a key into the padlock keyhole, turning a dial to a specific combination of numbers, or entering an alphabetical or numeric code into a keypad on the lock body. Most external locks have some type of physical structure fitted through a padlock eye aperture on the locker door.

Traditional internal locking devices are built into the locker door and frame. These internal locks extend through the locker door and engages with a locking plate on the frame or interior wall of the locker. Built-in internal locks may be operated by keys, combinations, or keypads. Some existing lockers have built-in locks which are electronically controlled, but these existing lockers and existing electronic locks may not be compatible with newer controlled access systems.

For facilities that possess locker structures on their premises, the costs and expenditures associated with replacing these older locker structures with new locker structures having newer controlled access systems can be significant. The existing locker structures are usually removed and discarded at a substantial cost, both economically and environmentally, to make room at the same facility for the new locker structures with newer controlled access systems.

There are material expenditures and costs associated with the acquisition of new locker structures in addition to the material costs associated with acquisition of the older locker structures. Moreover, there are significant labor costs associated with the removal and disposal of old locker structures in addition to the time and efforts associated with the installation of new locker structures. There is also a significant negative environmental impact associated with the disposal of older locker structures, which are usually deposited as waste in landfills, without any re-use, re-cycling or re-purposing of those older locker structures.

There is a need to reduce and conserve materials costs associated with the acquisition of new locker structures. There is also a need to reduce and conserve labor costs associated with removal and disposal of older locker structures and the installation of new locker structures and systems. For organizations choosing to operate sustainably by minimizing negative environmental impact, there is a need to avoid unnecessary and avoidable disposal of older locker structures into landfills.

SUMMARY OF THE INVENTION

The present invention addresses these needs by retrofitting pre-existing locker structures located at a facility with newer controlled access systems so that the older locker structures can be re-used, re-cycled, and re-purposed with newer locking mechanisms. The present invention is a method and system that provides for a universal retrofitting system that supports the installation of the newer controlled access technologies into the pre-existing locker structures, which results in material, labor and environmental efficiencies and savings. The universal retrofitting system and method is not dependent on particular models or types of new controlled access systems, but it designed and implemented to support flexible and universal application of many different types of the newer controlled access technologies into pre-existing locker structures. For example, the present invention allows for the retrofit of newer "smart" locking systems and mechanisms into pre-existing locker structures and compartments.

Disclosed herein is a method and system for supporting the installation of newer locking technology into pre-existing locker structures and compartments through the use of a specialized wireway lock mount. Disclosed herein is a specialized wireway lock mount for retrofitting electronic locking devices securely into existing locker compartments. The wireway lock mount supports the electronic locking device and secures the locking device and wiring inside the compartment. Using the disclosed wireway lock mount, the newer locking mechanism may be installed into pre-existing locker compartments without removing the existing lockers from the facility, demolishing the existing lockers, or causing significant damage to the surrounding structures.

In the disclosed method, existing external or internal locking mechanisms are removed from the existing locker structures and a universal wireway lock mount is installed in the locker structure to support the locking mechanism and provide wire-line support compatible with the newer locking technology. In the disclosed system, the retrofitted electronic locking devices may be used with an electronic communication system for receiving access credentials and granting access to locked compartments. Access credentials are received at an access terminal associated with either a bank of locker compartments or associated with an individual compartment.

The present invention is a system having a retrofitted locker storage unit with an electronic locking subsystem, comprising a locking device that is controlled electronically by one or more signals received from a first processing unit and the locking device being positioned inside the locker storage unit. The first processor receives signals from one or more mobile units to control a locked condition and an unlocked condition associated with the locking device. A reciprocal locking element is positioned inside the locker storage unit and capable of being engaged with the locking device. The locker storage unit is placed in the locked condition when the locking device and the reciprocal element are engaged and the locker storage unit is placed in the unlocked condition when the locking device and the reciprocal element are disengaged, wherein access to the contents in the locker storage unit is permitted when the locking device and the reciprocal element are disengaged and access to the contents in the locker storage unit is prevented when the locking device and the reciprocal element are engaged.

The present invention has a bracket frame having a length in proportion to one internal dimension of the locker storage unit, the bracket frame having a cavity extending longitudinally along the length of the bracket frame with the cavity being defined between a front panel, a first sidewall panel, a second sidewall panel, a first partial back panel and a second partial back panel. The front panel is coupled to the first sidewall and the second sidewall, the first sidewall is coupled to the first partial back panel, and the second side wall is coupled to the second partial back panel. An open slot associated with the bracket frame is defined between the first partial back panel and the second partial back panel. An aperture is on the front panel of the bracket frame, with the locking device being positioned proximate to the aperture on the bracket frame.

In the present invention, one or more wire cables are extending through the cavity of the bracket frame, the one or more wire cables being coupled to the locking device and providing the one or more signals from the processing unit to electronically control the locked condition and the unlocked condition of the locking device. The locking device receives power from the wire cables located in the cavity of bracket frame. The processing unit is coupled to a radio transceiver system is capable of receiving signals in a wireless transmission signal and the first processing unit is coupled to a control panel. The first processing unit receives signals from a wireless transmission to control the locked and unlocked condition associated with the locking device and the first processing unit, in response to the signals received, transmits the one or more signals to the locking device.

In the present system, the first processing unit is coupled to one or more Internet of things (IoT) sensors, and the first processor receives GPS signals related to the relative position of one or more mobile units to the locker storage unit. The keypad coupled to the first processor controls the locked and unlocked condition associated with the locking device. In the system, the locked condition and the unlocked condition is controlled by a physical latching engagement between the locking device and the reciprocal element and/or the locked condition and the unlocked condition is controlled by an electromagnetic latching engagement between the locking device and the reciprocal element.

Disclosed herein is a system having an electronic locking subsystem in a locker storage unit, comprising: a locking device that is controlled electronically by one or more signals received from a first processing unit and the locking device being positioned inside the locker storage unit. A reciprocal locking element is positioned inside the locker storage unit and capable of being engaged with the locking device. The locker storage unit is placed in a locked condition when the locking device and the reciprocal element are engaged, and the locker storage unit is placed in an unlocked condition when the locking device and the reciprocal element are disengaged.

In the disclosed system, a bracket frame has a length in proportion to one internal dimension of the locker storage unit, the bracket frame having a cavity extending longitudinally along the length of the bracket frame with the cavity being defined between a front panel, a first sidewall panel, a second sidewall panel, a first partial back panel and a second partial back panel. The front panel is coupled to the first sidewall and the second sidewall, the first sidewall is coupled to the first partial back panel, and the second side wall is coupled to said second partial back panel. An open slot associated with the bracket frame is defined between the first partial back panel and the second partial back panel; and an aperture on the bracket frame.

As disclosed, in the system having an electronic locking subsystem in a locker storage unit, one or more wire cables is extending through the cavity of the bracket frame, the one or more wire cables being coupled to the locking device and providing the one or more signals from the processing unit to electronically control the locked condition and the unlocked condition of the locking device. The first processing unit, in response to a signal received from the one or more mobile units, transmits the one or more signals to the locking device. The processing unit is coupled to a radio transceiver system capable of receiving signals in a wireless transmission signal and the first processing unit being coupled to a control panel.

In the system having an electronic locking subsystem in a locker storage unit, the first processing unit is coupled to one or more Internet of things (IoT) sensors. The first processor received signals from one or more mobile units to control the locked and unlocked condition associated with the locking device. The first processor receives signals from a wireless transmission to control the locked and unlocked condition associated with the locking device. The first processor receives GPS signals related to the relative position of one or more mobile units to the locker storage unit. The keypad coupled to the first processor controls the locked and unlocked condition associated with the locking device. The locking device receives power from the wire cables located in the cavity of bracket frame and/or the locking device receives power from one or more batteries located in the locker storage unit.

The present invention is also a system for installation of an electronic locking subsystem in a locker storage unit, comprising a locking device that is controlled electronically by one or more signals received from a first processing unit and the locking device being positioned inside the locker storage unit. A reciprocal locking element is positioned inside the locker storage unit and is capable of being engaged with the locking device. The locker storage unit is placed in a locked condition when the locking device and the reciprocal element are engaged, and the locker storage unit is placed in an unlocked condition when the locking device and the reciprocal element are disengaged.

The system has a bracket frame having a length in proportion to one internal dimension of the locker storage unit, the bracket frame having a cavity extending longitudinally along the length of the bracket frame with said cavity being defined between a front panel, a first sidewall panel, a second sidewall panel, a first partial back panel and a second partial back panel. The front panel is coupled to the first sidewall and the second sidewall, the first sidewall being coupled to the first partial back panel, and the second side wall being coupled to the second partial back panel. An open slot associated with the bracket frame is defined between the first partial back panel and the second partial back panel; and an aperture is on the front panel of the bracket frame, the locking device being positioned proximate to the aperture on the bracket frame.

In the system for installation of an electronic locking subsystem in a locker storage unit, one or more wire cables is extending through the cavity of the bracket frame, the one or more wire cables being coupled to the locking device and providing the one or more signals from the processing unit to electronically control the locked condition and the unlocked condition of the locking device. The locking device receives power from the wire cables located in the cavity of bracket frame. The processing unit is coupled to a radio transceiver system capable of receiving signals in a wireless transmission signal and the first processing unit being coupled to a control panel. The first processing unit receives signals from a wireless transmission to control the locked and unlocked condition associated with the locking device and the first processing unit, in response to the signals received, transmits the one or more signals to the locking device.

In the present system for installation of an electronic locking subsystem in a locker storage unit, the first processing unit is coupled to one or more Internet of things (IoT) sensors. The first processor receives signals from a wireless transmission to control the locked and unlocked condition associated with the locking device. The first processor receives GPS signals related to the relative position of one or more mobile units to the locker storage unit. Access to the contents in the locker storage unit is permitted when the locking device and the reciprocal element are disengaged. Access to the contents in the locker storage unit is prevented when the locking device and the reciprocal element are engaged.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE INVENTION

Figure 1:
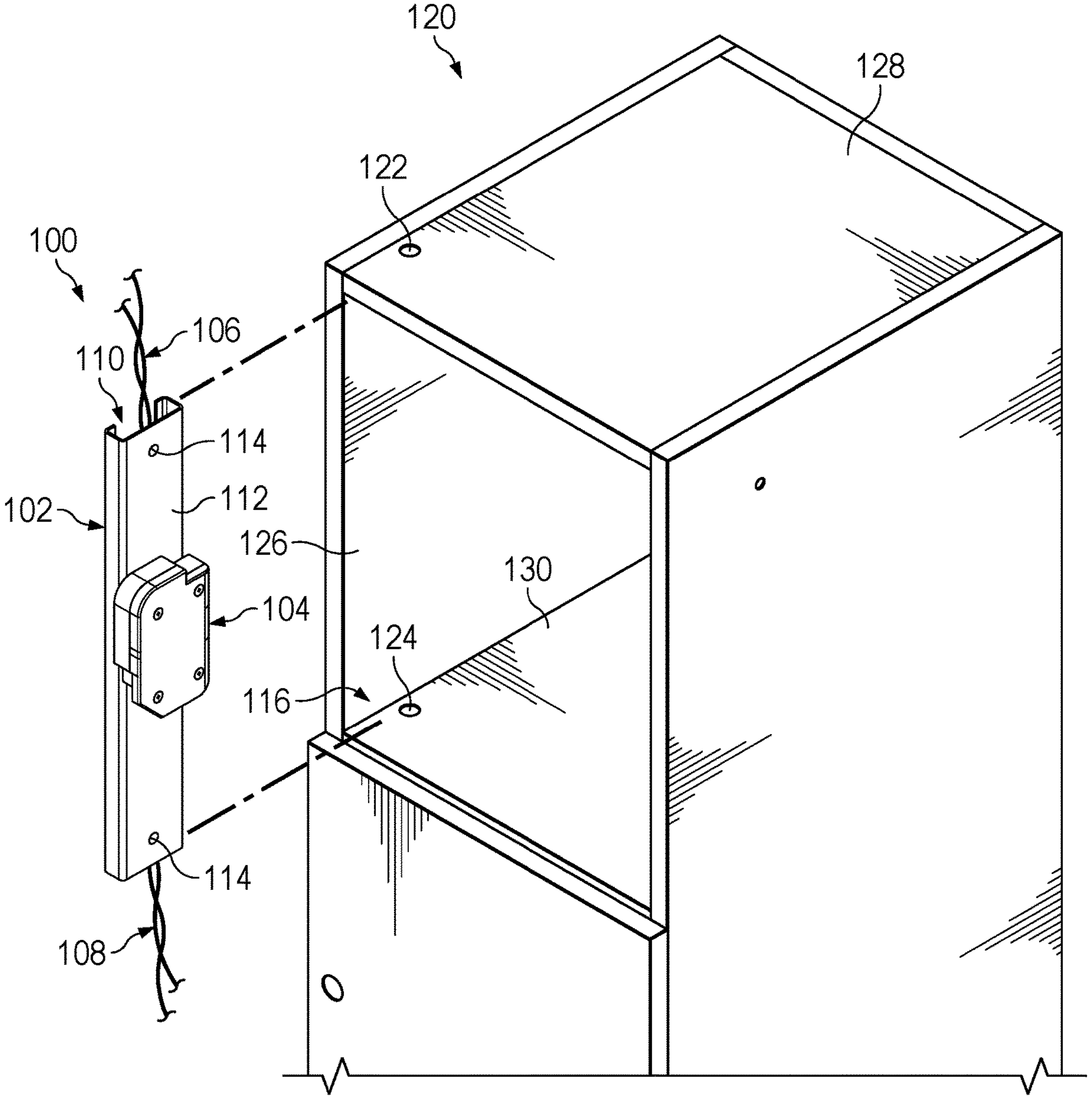
FIG. 1 shows a wireway lock mount and new locking device associated with an installation position in the present invention, as positioned adjacent to a pre-existing locker compartment.

The present invention is a system that provides for a universal retrofitting system that supports the installation of the newer controlled access technologies into the pre-existing locker structures, which results in material, labor and environmental efficiencies and savings. Disclosed herein is a method and system for supporting the installation of newer locking technology into pre-existing locker structures and compartments through the use of a specialized wireway lock mount.

Disclosed herein is a specialized wireway lock mount for retrofitting electronic locking devices securely into existing locker compartments. The wireway lock mount supports the electronic locking device and secures the locking device and wiring inside the compartment. Using the disclosed wireway lock mount, the newer locking mechanism may be installed into pre-existing locker compartments without removing the existing lockers from the facility, demolishing the existing lockers, or causing significant damage to the surrounding structures.

As disclosed, existing external or internal locking mechanisms are removed from the existing locker structures and a universal wireway lock mount is installed in the locker structure to support the locking mechanism and provide wire-line support compatible with the newer locking technology. In the disclosed system, the retrofitted electronic locking devices may be used with an electronic communication system for receiving access credentials and granting access to locked compartments. Access credentials are received at an access terminal associated with either a bank of locker compartments or associated with an individual compartment.

Locking devices usually possess a lock body that is installed on an interior surface of the compartment and a lock latch that is installed on the interior of the locker compartment door. When the compartment door is closed, the lock latch contacts the lock body, and the locking mechanism is engaged to secure the compartment. Electronic locking devices, or smart locks, are wired into a secure access system for opening the lock when access credentials are presented and verified. For most electronic locking devices, the lock re-engages to the locked position when the compartment door is closed.

The present invention is a system having a retrofitted locker storage unit with an electronic locking subsystem, comprising a locking device that is controlled electronically by one or more signals received from a first processing unit and the locking device being positioned inside the locker storage unit. The first processor receives signals from one or more mobile units to control a locked condition and an unlocked condition associated with the locking device.

A reciprocal locking element is positioned inside the locker storage unit and capable of being engaged with the locking device. The locker storage unit is placed in the locked condition when the locking device and the reciprocal element are engaged and the locker storage unit is placed in the unlocked condition when the locking device and the reciprocal element are disengaged, wherein access to the contents in the locker storage unit is permitted when the locking device and the reciprocal element are disengaged and access to the contents in the locker storage unit is prevented when the locking device and the reciprocal element are engaged.

The present invention has a bracket frame having a length in proportion to one internal dimension of the locker storage unit, the bracket frame having a cavity extending longitudinally along the length of the bracket frame with the cavity being defined between a front panel, a first sidewall panel, a second sidewall panel, a first partial back panel and a second partial back panel. The front panel is coupled to the first sidewall and the second sidewall, the first sidewall is coupled to the first partial back panel, and the second side wall is coupled to the second partial back panel. An open slot associated with the bracket frame is defined between the first partial back panel and the second partial back panel. An aperture is on the front panel of the bracket frame, with the locking device being positioned proximate to the aperture on the bracket frame.

In the present invention, one or more wire cables are extending through the cavity of the bracket frame, the one or more wire cables being coupled to the locking device and providing the one or more signals from the processing unit to electronically control the locked condition and the unlocked condition of the locking device.

The locking device receives power from the wire cables located in the cavity of bracket frame. The processing unit is coupled to a radio transceiver system is capable of receiving signals in a wireless transmission signal and the first processing unit is coupled to a control panel. The first processing unit receives signals from a wireless transmission to control the locked and unlocked condition associated with the locking device and the first processing unit, in response to the signals received, transmits the one or more signals to the locking device.

In the present system, the first processing unit is coupled to one or more Internet of things (IoT) sensors, and the first processor receives GPS signals related to the relative position of one or more mobile units to the locker storage unit. The keypad coupled to the first processor controls the locked and unlocked condition associated with the locking device. In the system, the locked condition and the unlocked condition is controlled by a physical latching engagement between the locking device and the reciprocal element and/or the locked condition and the unlocked condition is controlled by an electromagnetic latching engagement between the locking device and the reciprocal element.

Disclosed herein is a system having an electronic locking subsystem in a locker storage unit, comprising a locking device that is controlled electronically by one or more signals received from a first processing unit and the locking device being positioned inside the locker storage unit. A reciprocal locking element is positioned inside the locker storage unit and capable of being engaged with the locking device. The locker storage unit is placed in a locked condition when the locking device and the reciprocal element are engaged, and the locker storage unit is placed in an unlocked condition when the locking device and the reciprocal element are disengaged.

In the disclosed system, a bracket frame has a length in proportion to one internal dimension of the locker storage unit, the bracket frame having a cavity extending longitudinally along the length of the bracket frame with the cavity being defined between a front panel, a first sidewall panel, a second sidewall panel, a first partial back panel and a second partial back panel. The front panel is coupled to the first sidewall and the second sidewall, the first sidewall is coupled to the first partial back panel, and the second side wall is coupled to said second partial back panel. An open slot associated with the bracket frame is defined between the first partial back panel and the second partial back panel; and an aperture on the bracket frame.

As disclosed, in the system having an electronic locking subsystem in a locker storage unit, one or more wire cables is extending through the cavity of the bracket frame, the one or more wire cables being coupled to the locking device and providing the one or more signals from the processing unit to electronically control the locked condition and the unlocked condition of the locking device. The first processing unit, in response to a signal received from the one or more mobile units, transmits the one or more signals to the locking device. The processing unit is coupled to a radio transceiver system capable of receiving signals in a wireless transmission signal and the first processing unit being coupled to a control panel.

In the system having an electronic locking subsystem in a locker storage unit, the first processing unit is coupled to one or more Internet of things (IoT) sensors. The first processor received signals from one or more mobile units to control the locked and unlocked condition associated with the locking device. The first processor receives signals from a wireless transmission to control the locked and unlocked condition associated with the locking device.

The first processor receives GPS signals related to the relative position of one or more mobile units to the locker storage unit. The keypad coupled to the first processor controls the locked and unlocked condition associated with the locking device. The locking device receives power from the wire cables located in the cavity of bracket frame and/or the locking device receives power from one or more batteries located in the locker storage unit.

Also disclosed is a system for installation of an electronic locking subsystem in a locker storage unit, comprising a locking device that is controlled electronically by one or more signals received from a first processing unit and the locking device being positioned inside the locker storage unit. A reciprocal locking element is positioned inside the locker storage unit and is capable of being engaged with the locking device. The locker storage unit is placed in a locked condition when the locking device and the reciprocal element are engaged, and the locker storage unit is placed in an unlocked condition when the locking device and the reciprocal element are disengaged.

The system has a bracket frame having a length in proportion to one internal dimension of the locker storage unit, the bracket frame having a cavity extending longitudinally along the length of the bracket frame with said cavity being defined between a front panel, a first sidewall panel, a second sidewall panel, a first partial back panel and a second partial back panel. The front panel is coupled to the first sidewall and the second sidewall, the first sidewall being coupled to the first partial back panel, and the second side wall being coupled to the second partial back panel. An open slot associated with the bracket frame is defined between the first partial back panel and the second partial back panel; and an aperture is on the front panel of the bracket frame, the locking device being positioned proximate to the aperture on the bracket frame.

In the system for installation of an electronic locking subsystem in a locker storage unit, one or more wire cables is extending through the cavity of the bracket frame, the one or more wire cables being coupled to the locking device and providing the one or more signals from the processing unit to electronically control the locked condition and the unlocked condition of the locking device. The locking device receives power from the wire cables located in the cavity of bracket frame.

The processing unit is coupled to a radio transceiver system capable of receiving signals in a wireless transmission signal and the first processing unit being coupled to a control panel. The first processing unit receives signals from a wireless transmission to control the locked and unlocked condition associated with the locking device and the first processing unit, in response to the signals received, transmits the one or more signals to the locking device.

In the present system for installation of an electronic locking subsystem in a locker storage unit, the first processing unit is coupled to one or more Internet of things (IoT) sensors. The first processor receives signals from a wireless transmission to control the locked and unlocked condition associated with the locking device. The first processor receives GPS signals related to the relative position of one or more mobile units to the locker storage unit. Access to the contents in the locker storage unit is permitted when the locking device and the reciprocal element are disengaged. Access to the contents in the locker storage unit is prevented when the locking device and the reciprocal element are engaged.

FIG. 1 shows an assembled wireway lock mount 100 with a new technology (e.g. smart) lock 104 fastened to the lock mount front 112. One or more wires 106 for the smart lock 104 are directed upwards through the lock mount wire channel 110, and in some embodiments, one or more wires 108 may also be directed downward through the lock mount wire channel 110.

The assembled wireway lock mount 100 is directed 116 to the compartment side wall 126 in the locker 120. Wires 106 in wire channel 110 are guided through the top wire aperture 122 routed in the compartment top 128, and in some embodiments, wires 108 may be guided through the bottom wire aperture 124 routed in the compartment bottom 130. The smart lock or locking device shown in the figures is representative only and the wireway lock mount is designed to retrofit various types of locking devices into locker compartments.

The wireway lock mount is formed with folded edges in a “C” profile structure that provides open access to the wire channel 110, which creates easy access to the locking mechanism 104 to couple data and power connections. Moreover, the new locking device 104 is coupled to the lock mount 100 with attachment couplers connected to the lock mount 100 through lock mount apertures.

The disclosed invention in FIG. 1 shows retrofitting of electronically wired locking devices for installation into existing locker compartment 120. As shown in FIG. 1, as well as the other Figures in the present application, locker compartments 120 are composed of wood, laminate, melamine, metal, high density plastics or other materials suitable for secure locker compartments.

The present invention supports the retrofit installation of a new electronic lock 104 into a pre-existing locker 120 located at a customer facility, which eliminates the need for the removal and disposal of pre-existing locker structures 120 and/or the acquisition and installation of new locker structures. The present invention results in flexibility for end customers, further increasing the lifecycle of installed products and reducing unnecessary disposal of removed locker structures.

The method and system disclosed herein provide an economical way to retrofit existing lockers to be fully integrated smart lockers, without having to remove or replace the existing locker units. The method and system utilize the disclosed wireway lock mount 100 to integrate electronic locking devices 104 into the existing locker structures 120. The wireway lock mount 100 supports the new locking device 110 and secures the wiring 106 and 108 required for the electronic locking device 104.

The method and system are interoperable among multiple locking solutions and locker box constructions. The metal wiring channels can be customized to adopt and accommodate any wired locking solution. This retrofitted locking solution provides maximum usable space within the existing storage solution by taking only a minimal amount of space to accommodate the lock retrofit attachment.

The wireway lock mount 100 can be sized for the size of the locker compartment, but the present invention is a universal retrofit solution such that it can be installed in most pre-existing locker structures to support most types of new locking mechanisms. The wireway lock mount 100 may also be customized and fabricated from metal or other materials with adjustable channel sizes to accommodate specific wiring 106 and 106 for the new locking system.

The assembled wireway lock mount 100 is fastened to the compartment wall 126 such that the lock mount side 102 is aligned vertically to the compartment wall 126 and the wire channel 110 covers the top and bottom routed apertures, 122, 124 and the wires 106, 108. Self-tapping screws may be used to fasten the lock mount 100 to the locker compartment wall 126, or pilot holes may be drilled in the compartment wall 126 prior to placement of the wireway lock mount 100 in the compartment. Front to rear placement of the wireway lock mount 100 will also be determined by the position of the lock latch (not shown) when the compartment door is installed.

The wiring channel 110 of the wireway lock mount 100 can accommodate any storage compartment opening that will receive a new locking device and can accommodate any locker opening size. The metal edges of the wiring channel are folded in a “C” profile structure, with edges directed towards the inside of the wire channel 110 to give a distinct design and minimize visibility of exposed fasteners. The depth of the folded edges along with the width of the front portion can accommodate the support and wiring requirements for the newer locking mechanism 104. For example, a large bank of compartments may require more space in the wiring channel 110 and the edges can be folded on the wireway lock mount 100 to provide more depth to the wiring channel 110. The wiring channel 110 in the wireway lock mount 100 can also provide an off-set cavity for lock wiring and tapped fastening locations will facilitate the lock solution to be mounted and attachment of connection of any IoT devices as needed.

Holes and apertures 122, 124 for wiring insertion are drilled on-site to existing lockers. Hole sizes 122, 124 can vary to accommodate wiring needs, but the metal wiring channel 110 of the wireway lock mount 100 covers the drilled hole 122, 124 and the wires when installed inside the compartment 120. The wiring channels 110 and locking devices 104 are secured to the interior of the existing compartment 120 using fasteners specific for the locking solution. While it is most common for compartments to have wiring holes 122, 124 placed in the top and bottom of the compartment 120 for doors that are attached at the left or right sides of a compartment, in compartments where the doors lift up or drop down, the wiring holes will be in the side walls to accommodate wiring. The wireway lock mount 100 can be finished in multiple colors to match the interior color format of the existing locker compartments 120.

When a facility wants to upgrade its pre-existing lockers with newer lockers and locking technology, the present invention supports the economical and environmental option retrofitting of new locking technology into the pre-existing locker structures. Steps for installing the wireway mount and retrofitting a smart lock for the top compartment of a locker bank are shown in 2A-2D.

Figure 2A:
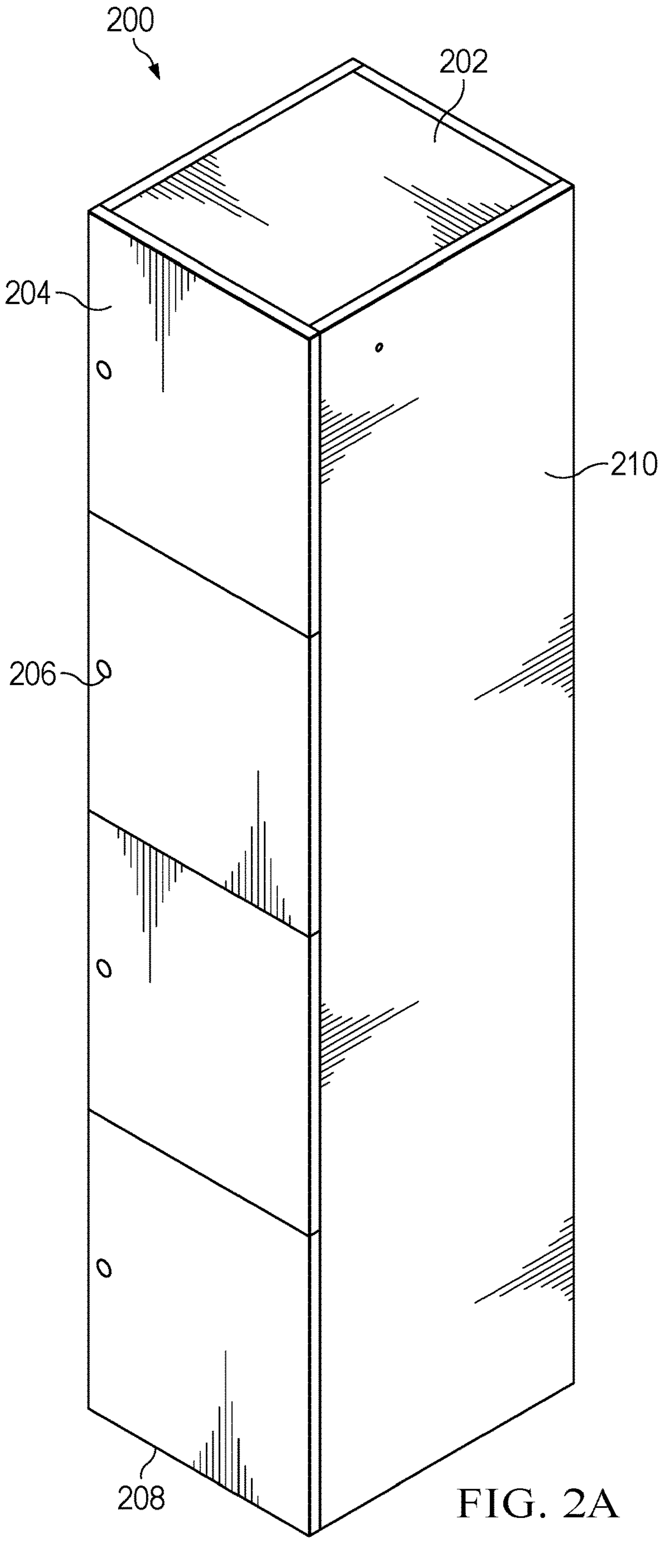
FIG. 2A shows a bank of pre-existing locker compartments having standard locks.

In FIG. 2A, a bank of existing lockers 200 is shown having standard locks that are to be retrofitted with smart lock technology. The locker bank shown has four vertically stacked compartments each having an existing door 204 and an existing lock 216. The locker top section 202 closes the top compartment 200, the locker bottom section 208 is adjacent to the floor, and the locker right side wall 210 may be either the outside edge of the locker bank or placed adjacent to another column of lockers. The top section 202 and right-side wall 210 for locker compartment 204 are shown in FIG. 2A-2D. The existing locks 216 may be any of the standard types of locks, such as keyed lock, numeric pad lock, or combination lock, or may be an older type of smart lock which is not compatible with an updated access system for the facility.

Figure 2B:
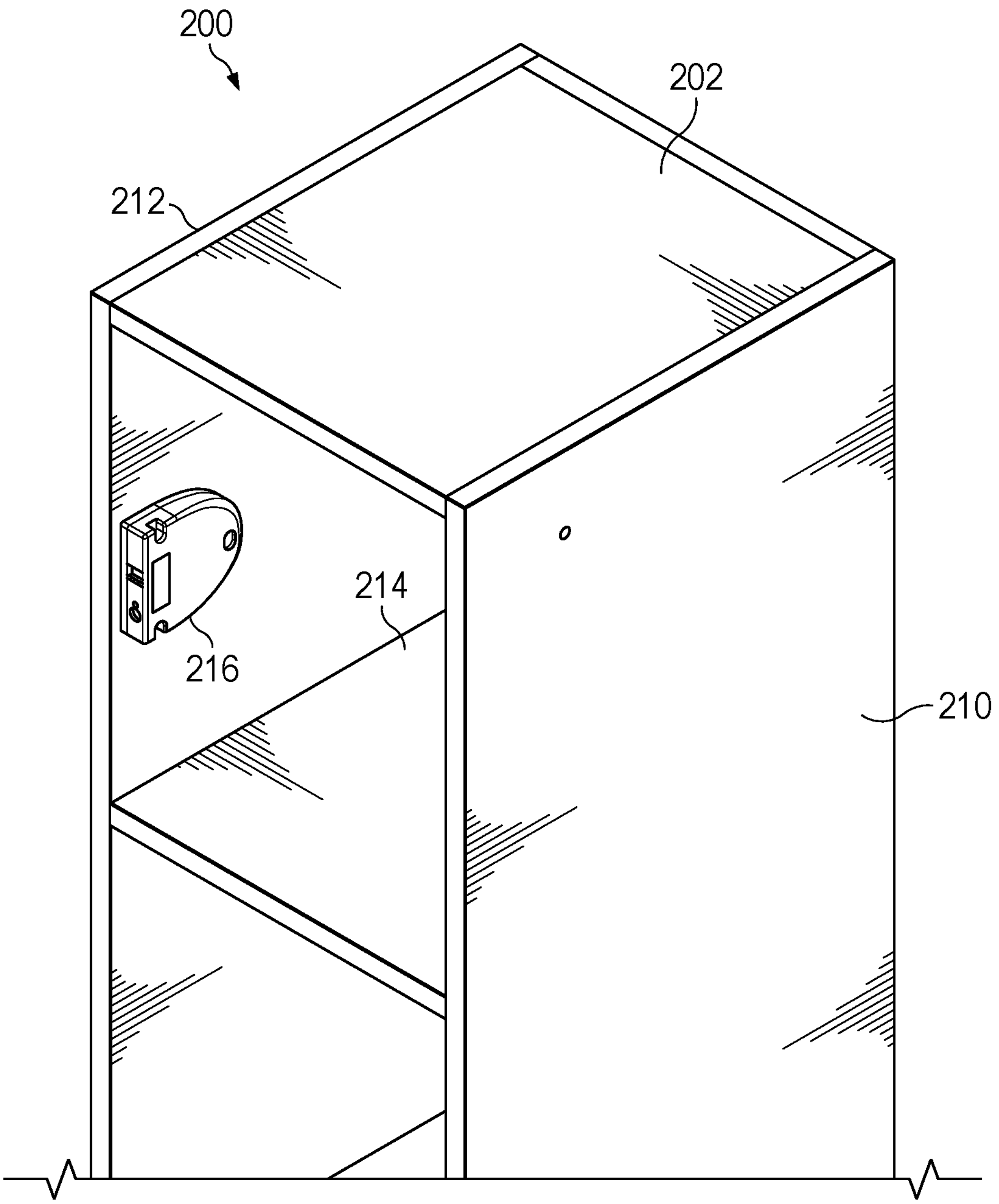
FIG. 2B shows the interior of a pre-existing locker compartment with an exemplary standard lock.
Figure 2C:
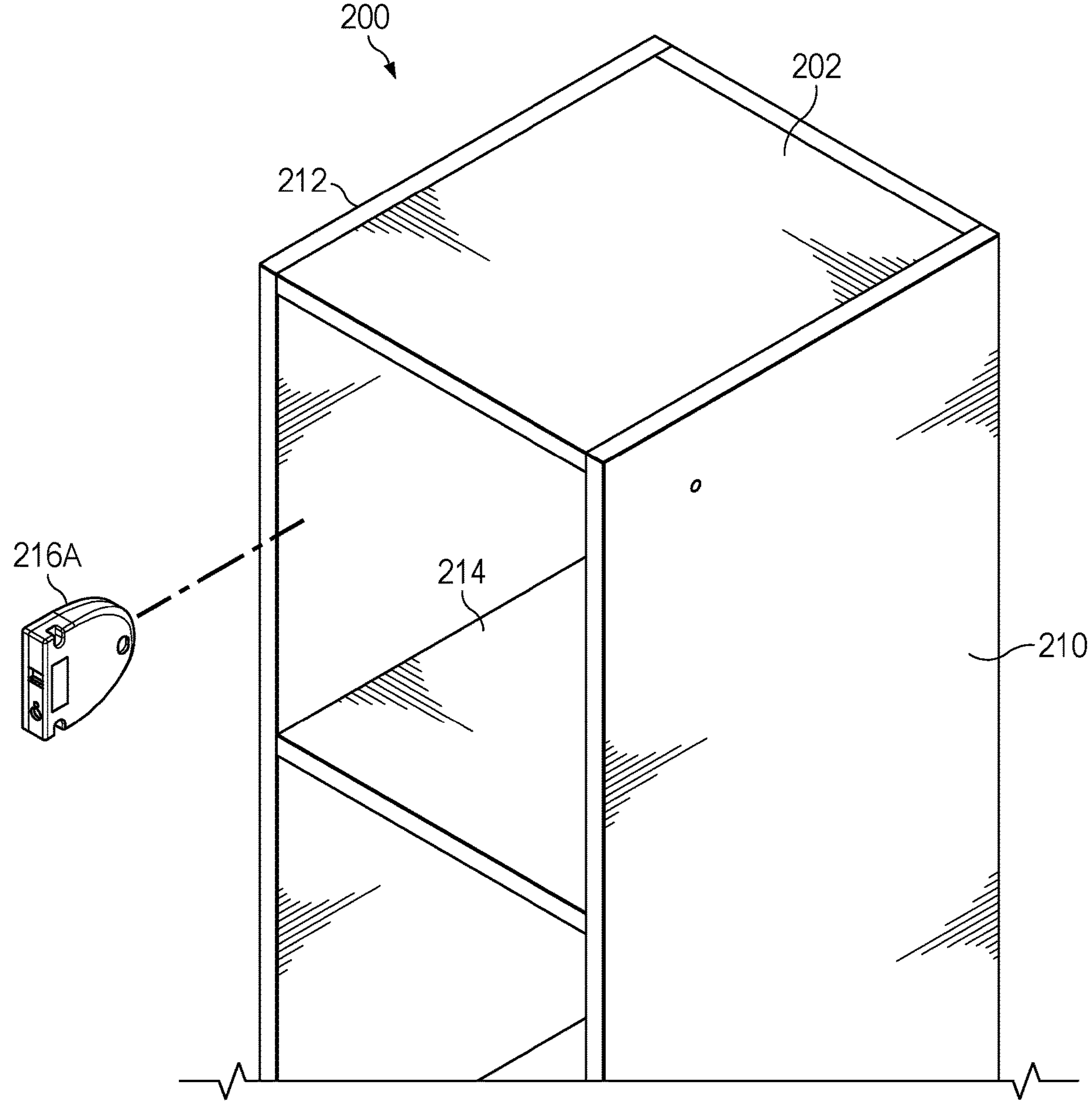
FIG. 2C shows the interior of a pre-existing locker compartment with the exemplary standard lock removed.

The first step for retrofitting the locker compartments with newer technology locks is to remove the existing doors and locks. In FIG. 2B, the door (204 and 206 in FIG. 2A) have been removed to expose the interior of the top compartment. The interior part of the existing lock 216 is seen affixed to the locker left side wall 212 on the interior of the compartment. As seen in FIG. 2C, the existing lock 216A has been removed from the compartment.

Figure 2D:
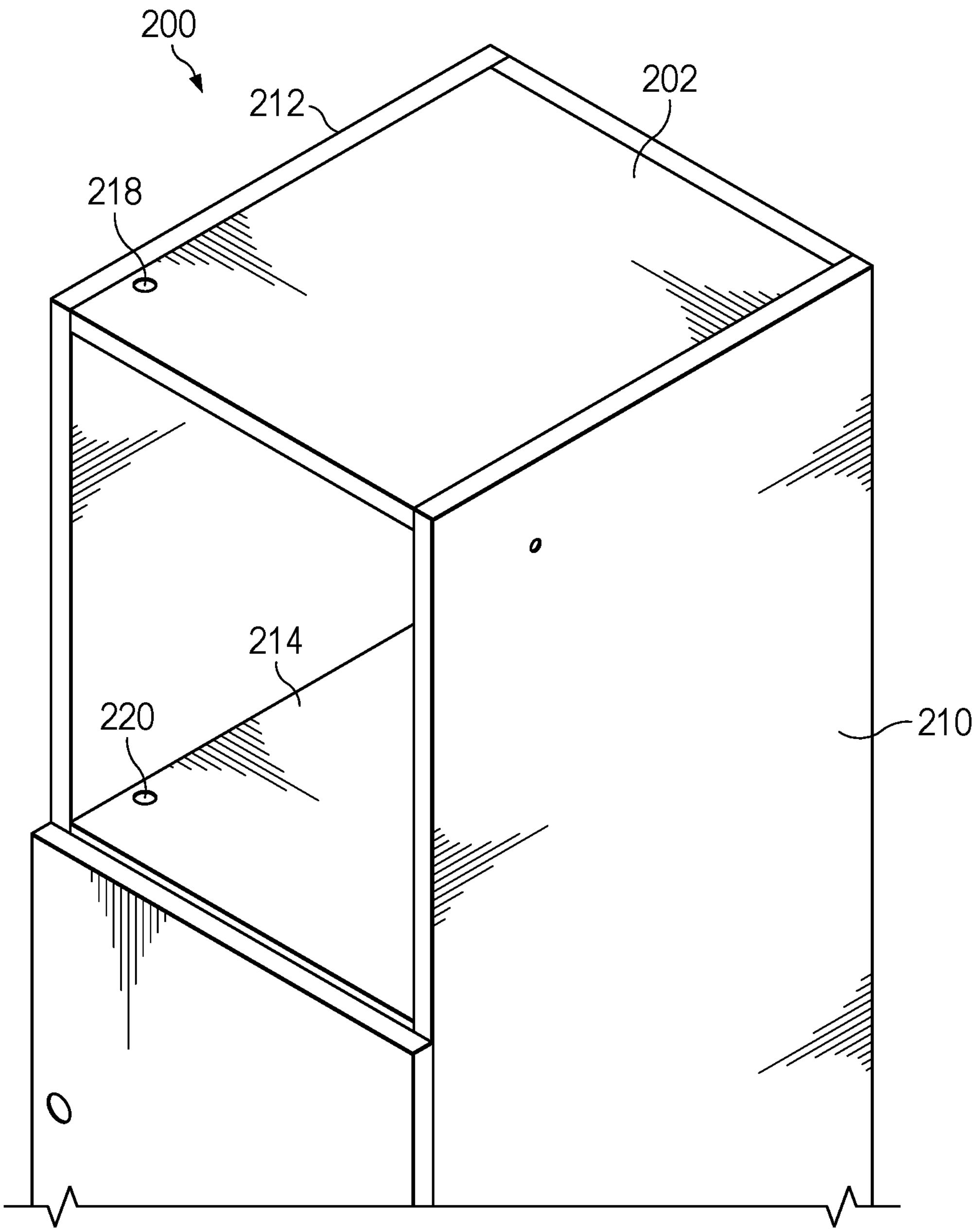
FIG. 2D shows the interior of a pre-existing locker compartment with wire apertures.

Once the existing lock is removed, apertures for passage of wiring between the compartments are drilled in the existing lockers. In FIG. 2D, a routed top aperture 218 through the top section 202 of the locker is shown and a routed bottom aperture 220 through the bottom section 214 of the compartment is shown.

Dimensions of the routed apertures 218 and 220 (FIG. 2D) vary depending on the size and number of wires that will pass through the apertures 218, 220. For example, a column of lockers with five compartments may need a larger wire aperture than a column having two compartments. When the retrofitted lock installation is completed, the apertures and any wiring will be completely enclosed inside the wireway lock mount 100 (FIG. 1). Once the existing lock 216 from FIGS. 2B and 2C is removed and the top and bottom apertures have been added (FIG. 2D), the locker compartment is ready for installation of the wireway lock mount 100 and the new locking device 104 (shown in FIG. 1).

Figure 3A:
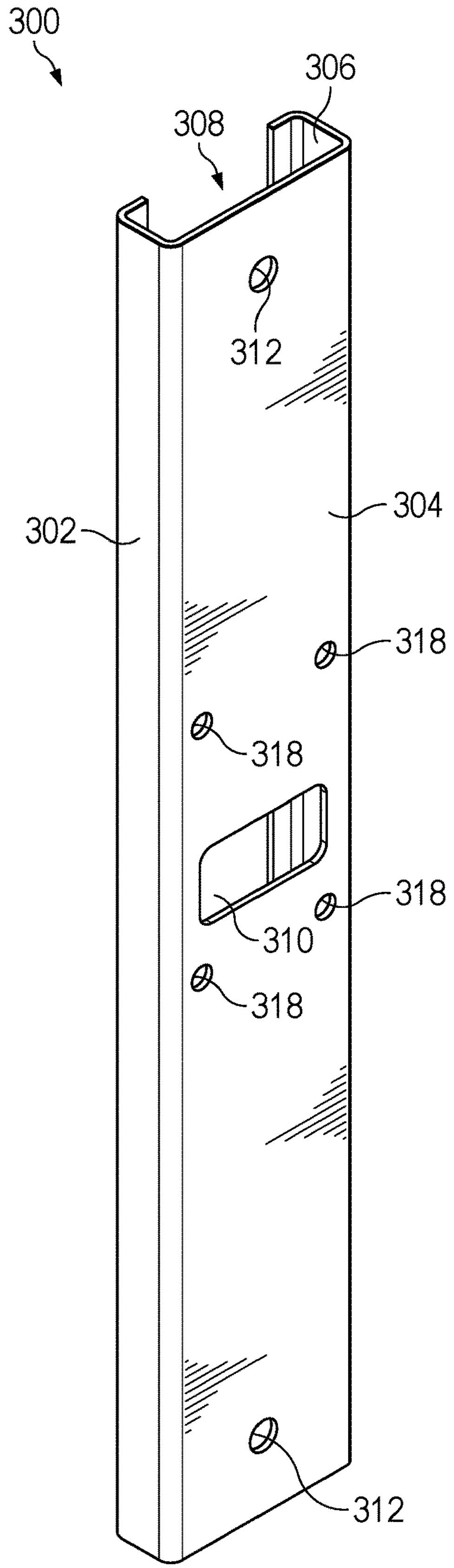
FIG. 3A shows the wireway lock mount used in the present invention.
Figure 3B:
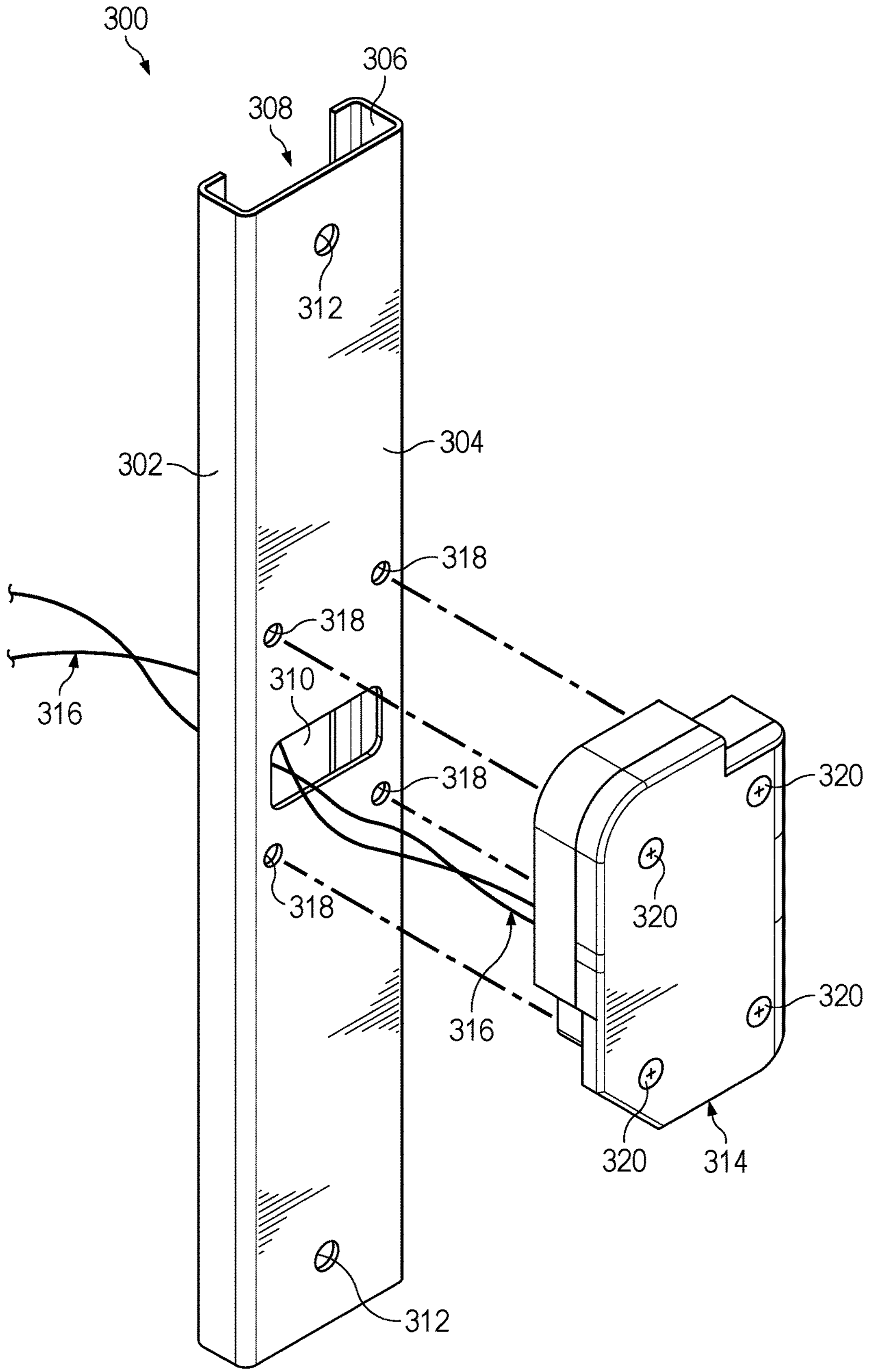
FIG. 3B shows the new locking mechanism adjacent to the wireway lock mount in the present invention.
Figure 3C:
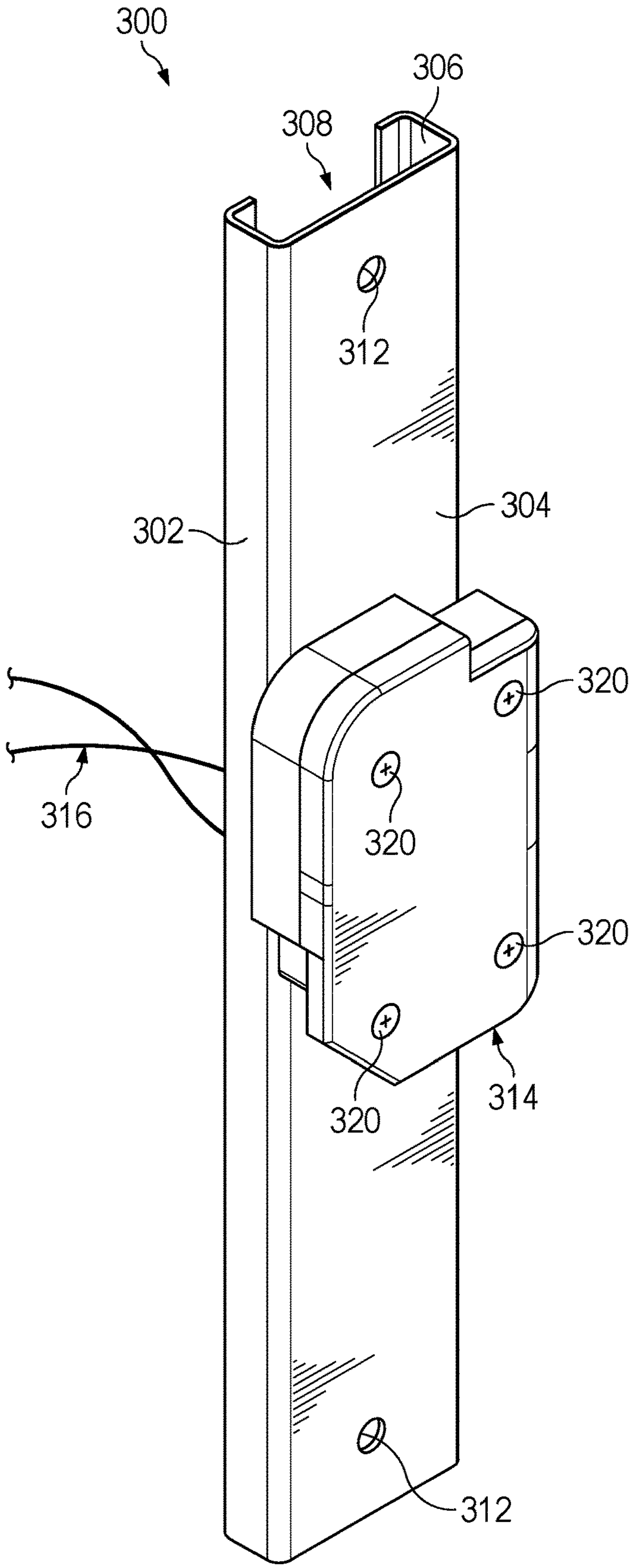
FIG. 3C shows the new locking mechanism mounted on the wireway lock mount in the present invention.

FIGS. 3A, 3B and 3C show a wireway lock mount 300 which will hold the interior part of the retrofitted smart lock and enclose the lock wiring. Wireway lock mounts are designed and fabricated specific to the storage opening size and type of locking solution that needs to be retrofitted. The wireway lock mount 300 is fabricated of metal with channel side edges 302, 306 folded inwards toward the interior wire channel 308 to give the lock mount a distinct design and to minimize visibility of exposed fasteners. The channel side edges on both sides of the channel will seat flush against the compartment wall.

In FIGS. 3A, 3B and 3C, the wiring channel 308 of the wireway lock mount 300 can accommodate any storage compartment opening that will receive a new locking device and can accommodate any locker opening size. The metal edges of the wiring channel are folded in a “C” profile structure, with edges directed towards the inside of the wire channel 308 to give a distinct design and minimize visibility of exposed fasteners. The depth of the folded edges along with the width of the front portion can accommodate the support and wiring requirements for the newer locking mechanism 314. For example, a large bank of compartments may require more space in the wiring channel 308 and the edges can be folded on the wireway lock mount 300 to provide more depth to the wiring channel 308. The wiring channel 308 in the wireway lock mount 300 can also provide an off-set cavity for lock wiring and tapped fastening locations will facilitate the lock solution to be mounted and attachment of connection of any IoT devices as needed.

The length of the lock mount 300, width of lock mount front 304, and depth of the lock mount sides 302, 306 are customizable to the specific retrofitted locking solution to accommodate any locker compartment opening size. Varying the width of the lock mount front 304 and sides 302, 306 will vary the area inside the interior wire channel 308 to accommodate wiring required for multiple newer technology locks. A lock wire aperture 310 is situated on the front 304 of the lock mount to serve as a passage for the smart lock wires. The size, shape, and position of the lock wire aperture 310 in the lock mount front 304 may be customized to accommodate specific locking devices.

Tapped holes 312 for fastening the wireway lock mount 300 to the interior of the locker cabinet are shown at the top and bottom of the wireway lock mount. Tapped holes 318 are shown on the lock mount front 304 around the lock aperture 310 for fastening the smart lock to the wireway lock mount 300. Tapped holes 312 and 318 are representative only, and it is understood in this disclosure that the number and placement of the tapped holes, as well as any fasteners used, would be determined by the configuration of the locker compartments and the type of locking device being installed.

FIG. 3B shows a wired locking device 314 adjacent to the wireway lock mount 300 prior to fastening. Wires 316 protruding from the back side of the lock 314 are threaded through the lock wire aperture 310 on the lock mount front 304. Fastener holes 320 through the smart lock 314 are aligned with the tapped holes 318 on the lock mount front 304, and as seen in FIG. 3C, the smart lock 314 is secured to the wireway lock mount 300. The locking device shown in the figures is representative only and the wireway lock mount is designed to retrofit various types of locking devices into locker compartments. Screws, locking pins, or other fastener types suitable to the material of the locking device are used to fasten the smart lock. The type, number, and position of the fasteners will be determined by the type of locking device used in the compartment.

In FIGS. 3A, 3B and 3C, tapped holes 312 for fastening the wireway lock mount to the interior of the locker cabinet are shown at the top and bottom of the wireway lock mount, tapped holes 318 are shown on the lock mount front 304 for fastening the smart lock to the wireway lock mount, and fastener holes 320 are shown for fastening the smart lock 314 to the lock mount 300; however, it is understood that the number and placement of the tapped holes for fasteners is customizable for the type of retrofitted locking solution.

Once the locker compartment has been prepared as shown in FIGS. 2A-2C, and the wireway lock mount has been assembled with the locking device as shown in FIGS. 3A-3C, the assembled wireway lock mount is installed in a locker cabinet.

Figure 4A:
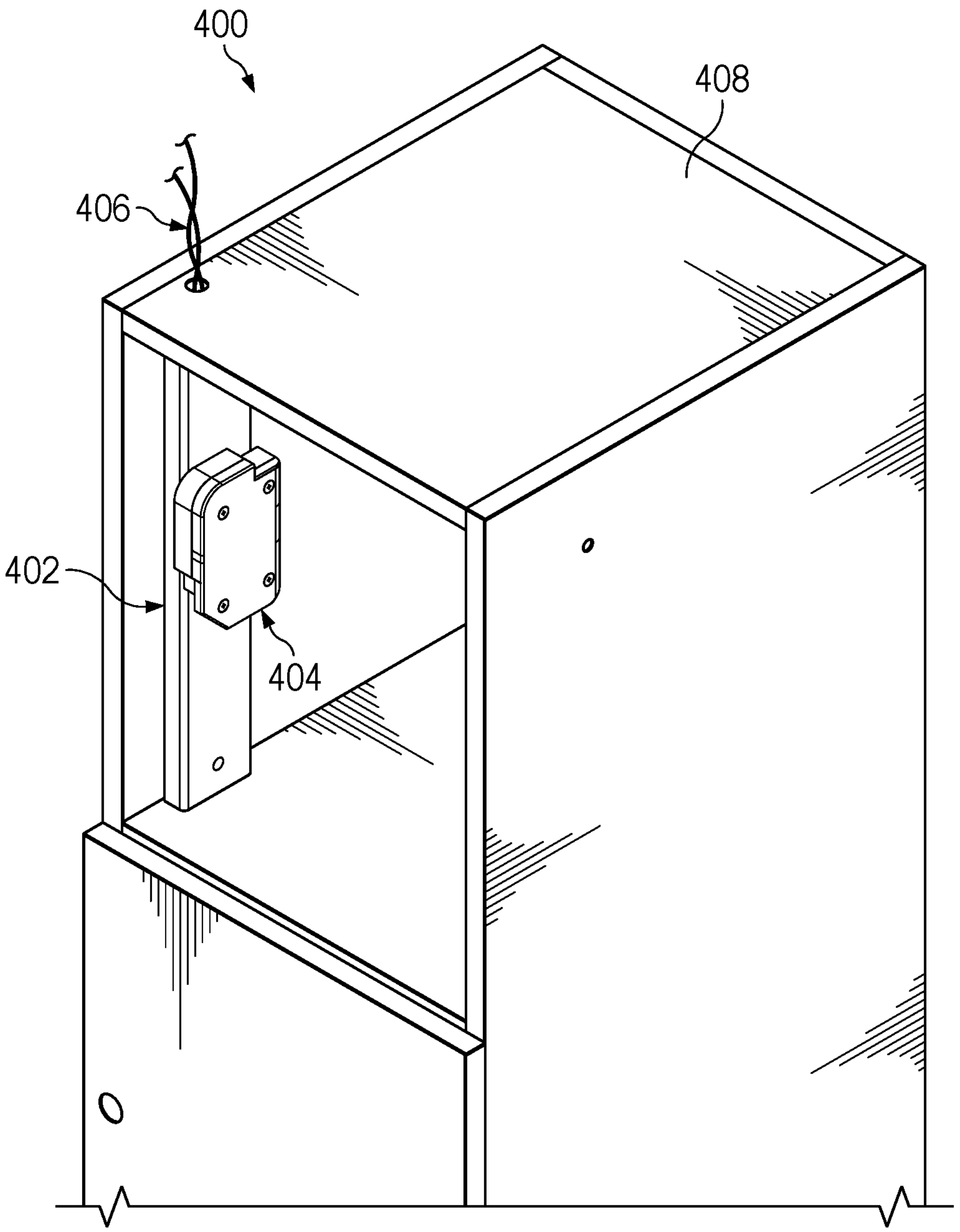
FIG. 4A shows a locker compartment after installation of the new locking device on the wireway lock mount.

FIG. 4A shows the wireway lock mount 402 with the attached smart lock 404 installed in the top locker compartment of the locker bank 400. Wires 406 extend from the top 408 of the locker bank 400. The wireway lock mount 402 is positioned in the locker compartment at the top, bottom, and side wall such that all the wiring is fully enclosed in the lock mount and the fasteners are flush with the lock mount and smart lock for a smooth appearance inside the compartment, and wires are not exposed to enhance the security and safety of the locker system (prevents unauthorized accesses).

Figure 4B:
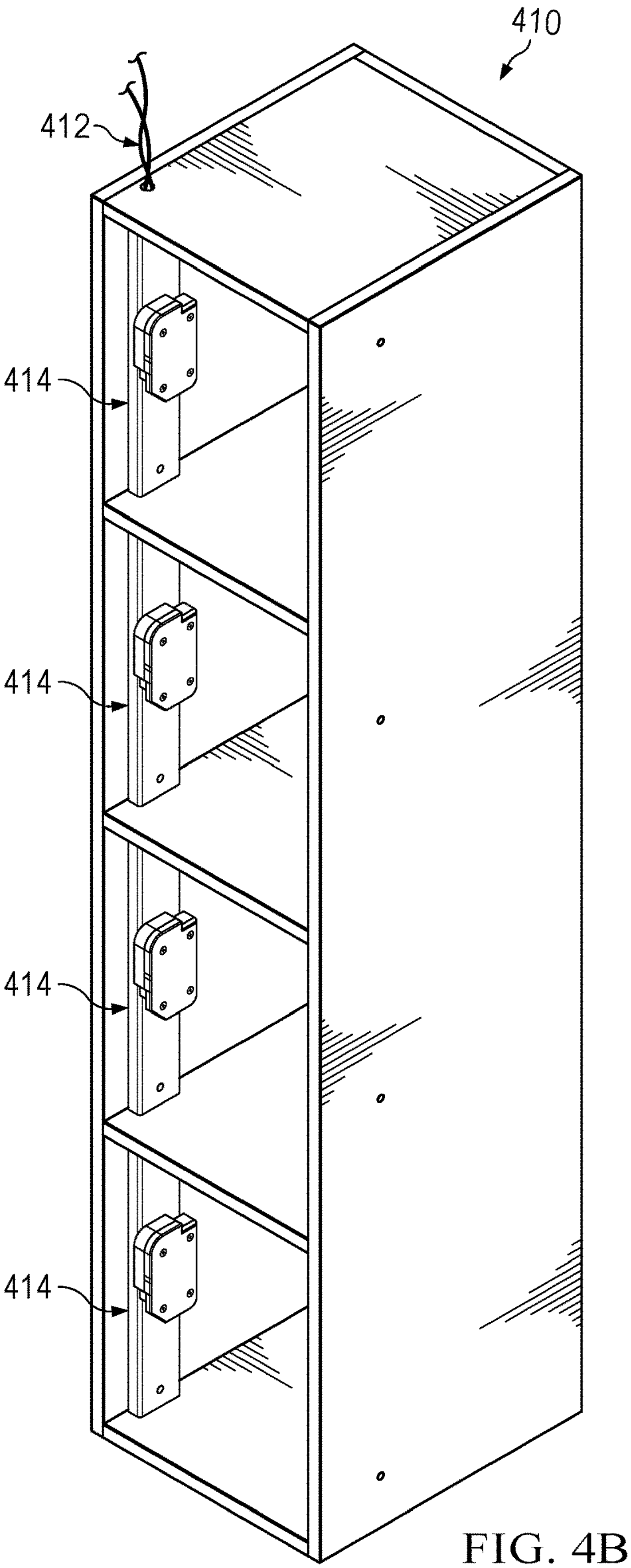
FIG. 4B shows a bank of lockers after installation of the new locking device on the wireway lock mount.

FIG. 4B shows a locker bank 410 having four compartments retrofitted with assembled wireway lock mounts 414 in each compartment. In this configuration, wiring 412 for the four assembled wireway lock mounts extends from the top of the locker bank. In use, the wiring is then directed through a wall, ceiling, conduit, or other secure pathway to connect to the access-controlled locking system.

Figure 5:
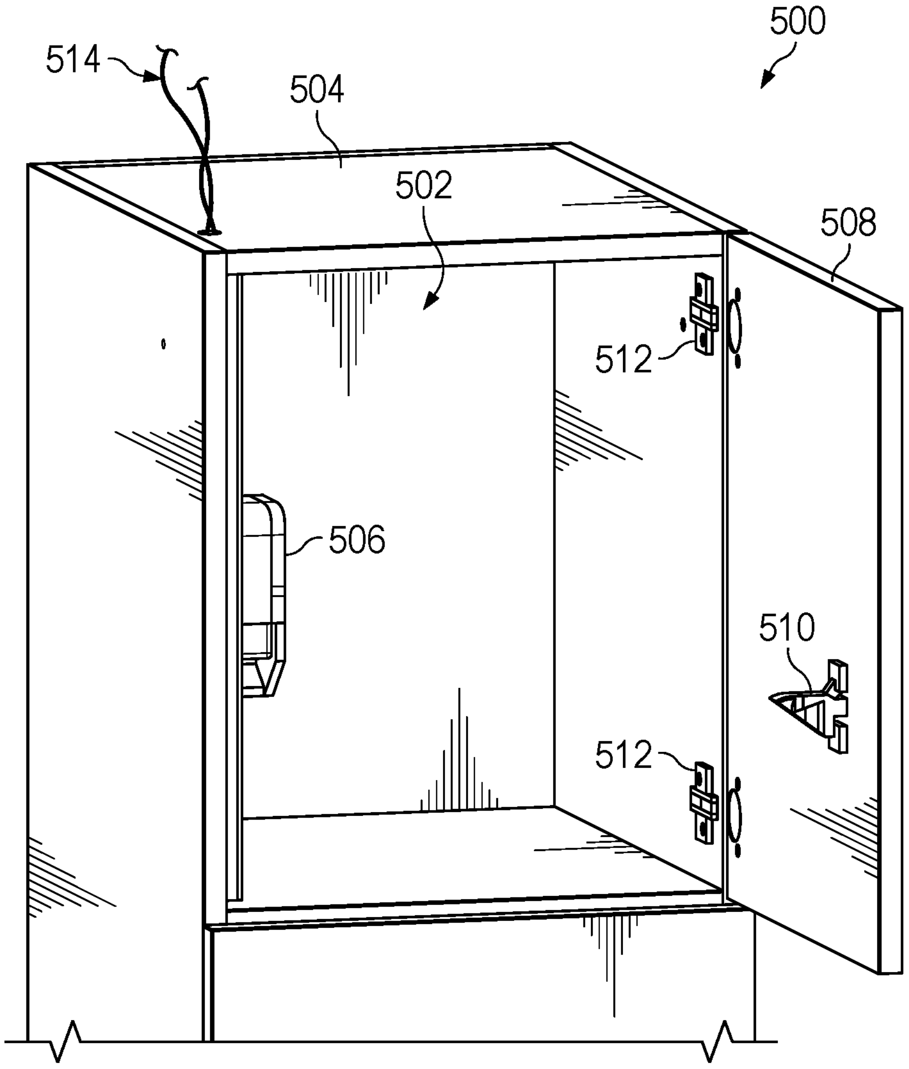
FIG. 5 shows a locker compartment with the new locking device installed on the wireway lock mount and a door latch installed on the interior of the locker door.

FIG. 5 shows a compartment of a locker bank 500 with a door 508 installed. The assembled wireway lock mount with attached smart lock 506 is shown installed on the side wall of the compartment interior 502 with wires 514 exiting from the top of the locker compartment 504. The door 508 is attached to the opposite side wall of the locker compartment 500 with top and bottom hinges 512. The smart lock latch 510 is positioned on the door 508 so that the latch 510 couples with the body of the smart lock 506 in the compartment interior to latch securely when the door 508 is closed.

The lock 506 and latch 510 shown in FIG. 5 is representative only and will vary according to the type of lock 506 and latch 510 required for access to a specific secured system. Likewise, the door 508 shown installed on the right side of the locker 500 is representative only, and the door of the compartment may be fitted on the right side, left side, top or bottom of the compartment depending on the type of locker in use. Moreover, the latch 510 may be a physical latch that is coupled to the lock 506, or it may be a magnet component latch 510 that is activated and locked with the lock 506 by powering the magnetic field to secure the door 508.

Figure 6:
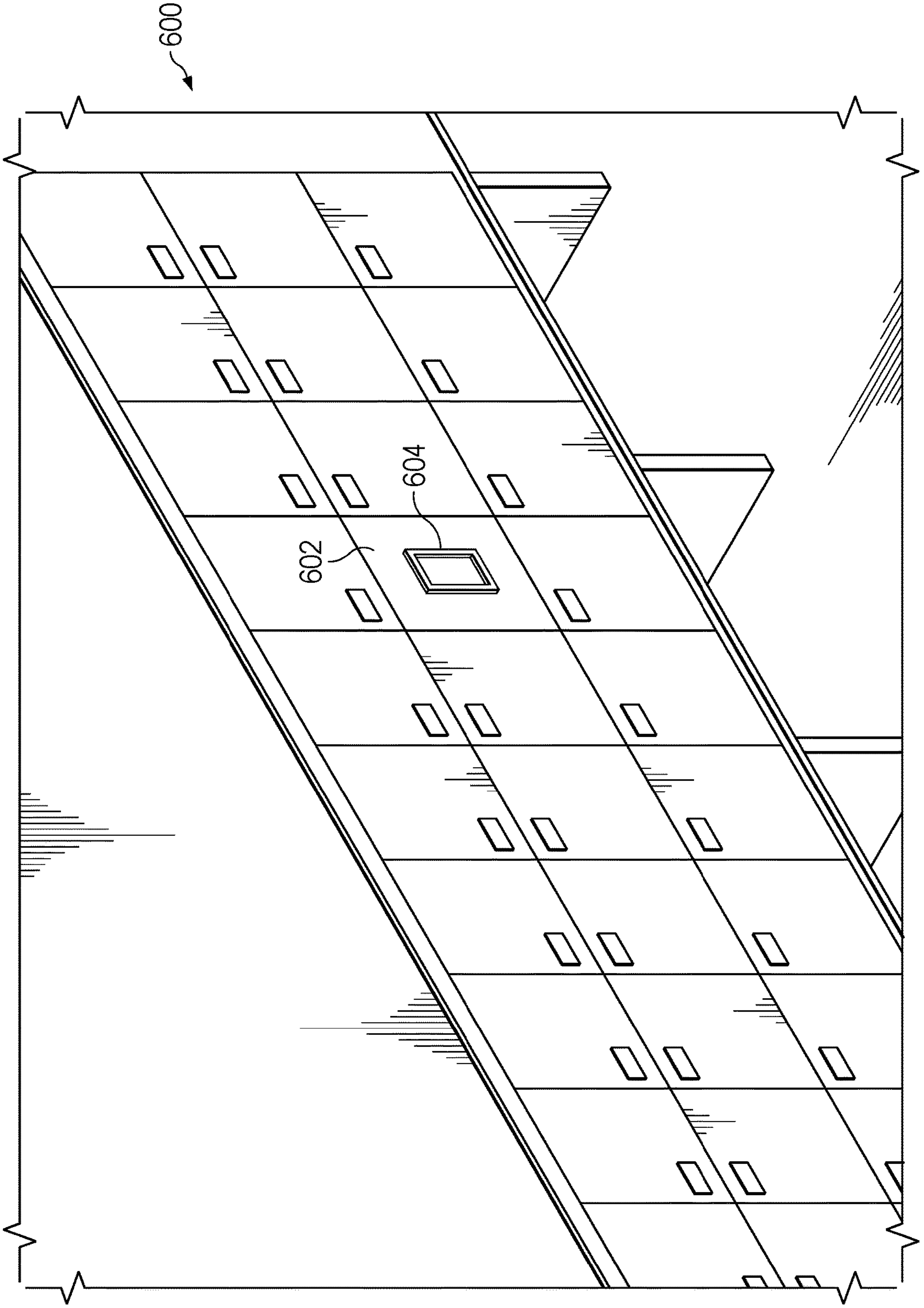
FIG. 6 shows a bank of locker compartments with an centralized electronic access terminal for the array of lockers.
Figure 7:
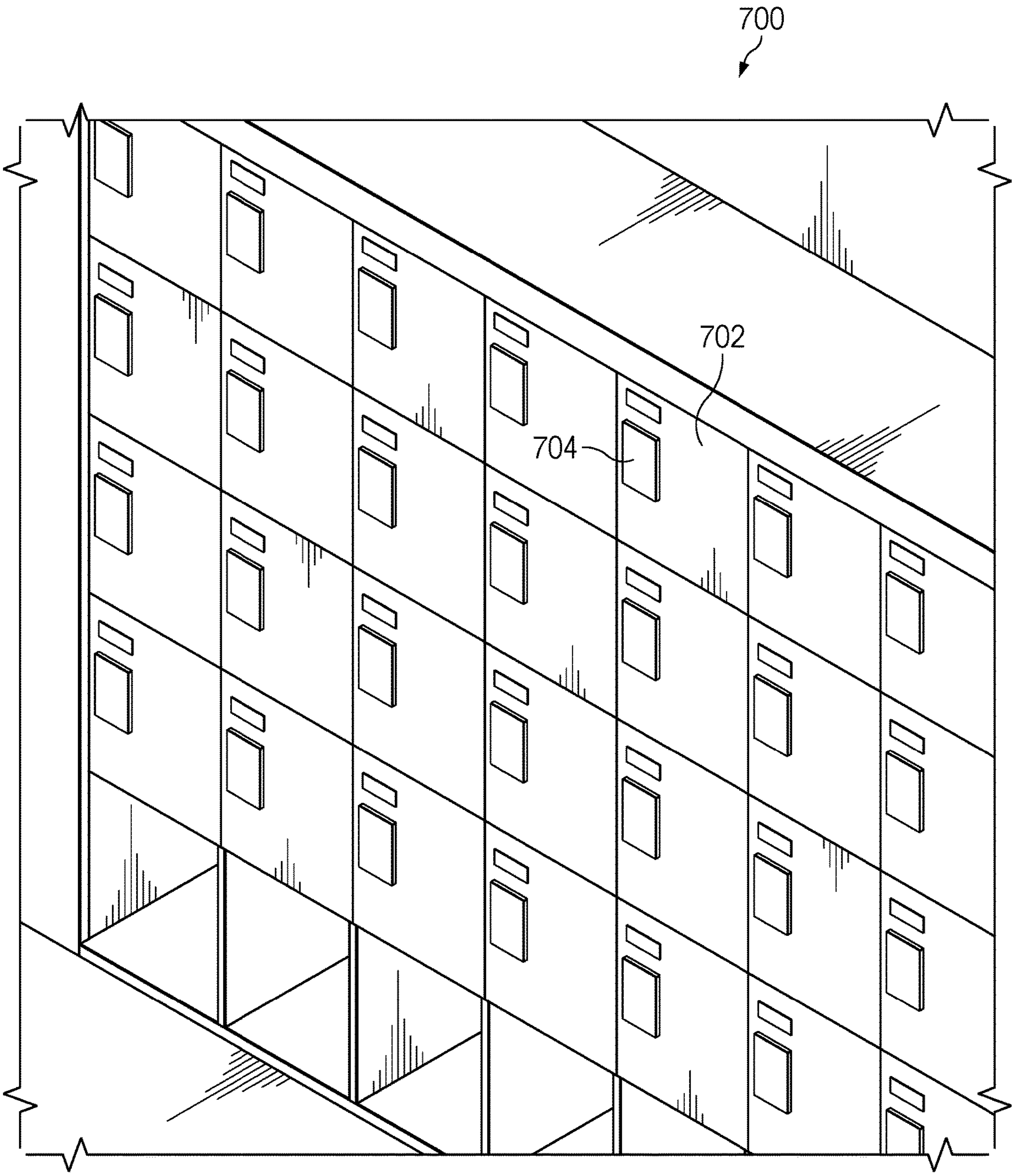
FIG. 7 shows a bank of locker compartments with each locker compartment having an electronic access terminal.
Figure 8:
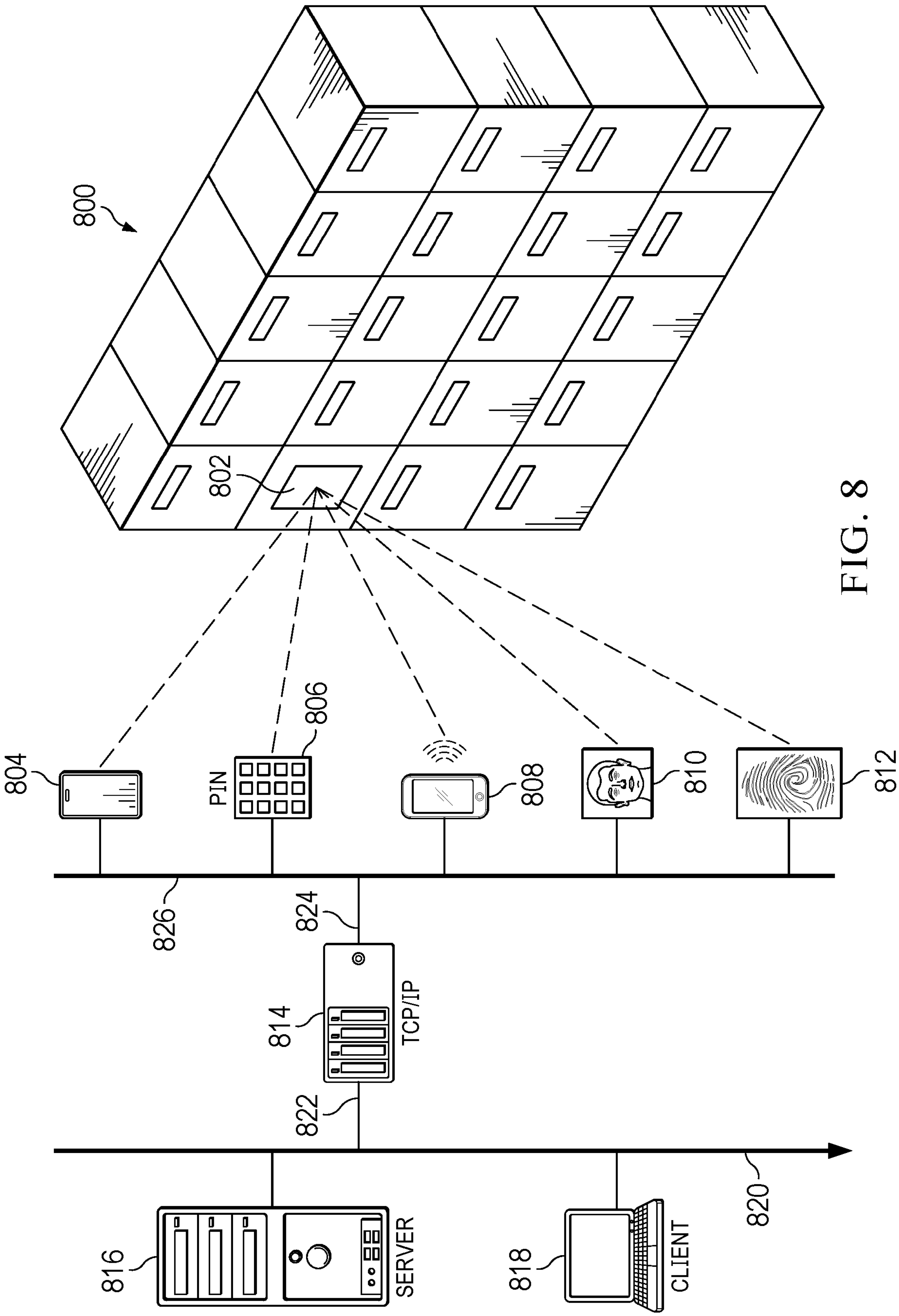
FIG. 8 shows a simple schematic for accessing locker compartments with retrofitted newer locking devices.

As shown in FIG. 6-8, the system and method of the disclosed invention is applicable to both smart locker banks with a centrally located smart access terminal and smart locker banks having individual access pads. The solution is interoperable among multiple locking solutions and box construction. Wireway lock mounts can be customized to adopt and accommodate any wired locking solution.

For example, FIG. 6 shows a smart access locker bank 600 having numerous compartments with a smart access terminal 604 in a centrally located position 602 of the locker bank. In this type of locker bank, a user will access a locker compartment by entering access credentials at the centrally located smart access terminal 604. When verified credentials are entered into the central terminal, the locker number associated with the entered credentials will be opened.

FIG. 7 shows a smart access locker bank 700 having numbered compartments where each compartment has a smart access pad. In this type of locker bank, a user will access a locker compartment by entering access credentials at a smart access pad 704 located on a specific locker 702. When verified credentials are entered into the smart access pad, that specific locker will be opened.

As shown in FIG. 6-8, these newer locking mechanisms and locker arrays have been developed having "smart" capabilities, wherein the locks are actuated at the locker by keypads, keycards, or by mobile devices. These locks may also be actuated remotely from a central location or from a wireless device such a mobile phone. These types of smart lockers can be integrated with third party software systems for tracking use, granting access, and identification of users for lockers. Smart lockers are an innovative solution for increasing security of lockers and for ease of granting access to users.

In the disclosed system and methods (FIGS. 1, 3-8), the retrofitted electronic locking devices may be used with an electronic communication system for receiving access credentials and granting access to locked compartments. Access credentials are received at an access terminal associated with either a bank of locker compartments or associated with an individual compartment. Disclosed herein is a method and system for retrofitting electronic wired locking technology (smart locks) into existing locker compartments utilizing a specialized wireway lock mount device. Using the disclosed wireway lock mount, smart lock technology may be installed in existing locker compartments without removing the existing lockers from the facility, demolishing the existing lockers, or causing significant damage to the surrounding structures.

The locking devices may be actuated at the locker compartment by any known access credential sending device. Access credential sending devices may include keypads, keycards, key fobs, apps on mobile devices, QR codes or access codes delivered on mobile devices, such as a mobile phone. The access credentials may also be biometrics, such as facial recognition, fingerprints, or iris scan. The locks may also be actuated remotely from a central location, from a central keypad, or from a wireless device such a mobile phone.

The present retrofitted system is shown in FIG. 8, which is a simple schematic for accessing smart lockers via use of an Internet of Things (IoT) protocol. A smart locker bank 800 having multiple compartments is shown with a centrally located access terminal 802. Depending on the type of system, a user may be required to enter a specific type of credential, for example, swiping or tapping a key card 804 across the access terminal 802, or the user may be able to select from several available credential options. Some available options include key cards or fobs 804 that are swiped or tapped on the access terminal, entering a personal identification number (PIN) on an electronic keypad on the access terminal, using a mobile app that wirelessly sends the credentials when placed near the access terminal.

Biometric credentials, such as facial recognition or iris scan at the access terminal that identifies a specific user, or a fingerprint reader that identifies a specific user. The type of credentials that a user may present will depend on the type locking device and how the locking devices are configured in the system. Each of these presented credentials is routed 824 through the transmission control protocol/internet protocol 814 for the secure access system and routed 822 to the system server 816 or computer 818 of a system administrator. Access of the user to the system 826 or from the system to the user 820 may be conducted wirelessly.

Figure 9:
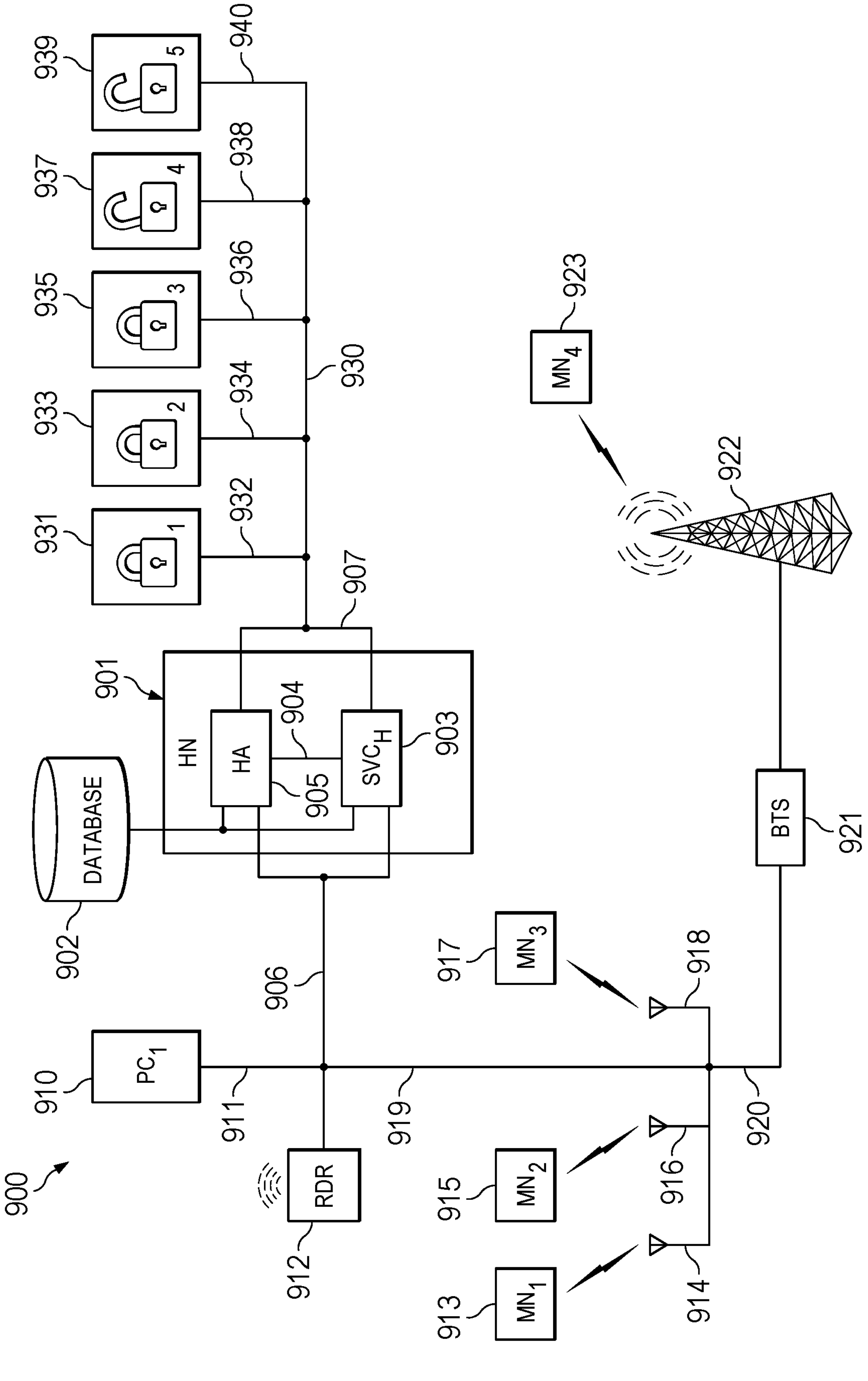
FIGS. 9-12 show embodiments of communication networks according to the present invention.

The present invention is also shown by the block diagram in FIG. 9, as a local communication system 900, or local area network (LAN), supporting the processing communications between a home network 901 and one or more radio frequency receiving smart lock devices 931, 933, 935, 937, and 939, where the home network 901 has a home agent 905 coupled having a gateway server to a home network computer server(h) (SVR(h)) 903 by line 904. The home network computer server(h) 903 has a gateway server and home network computer server(h) 903 is coupled to one or more database memory 902. A communications link or line is any connection between two or more nodes on a network or users on networks or administrative domains, including serial lines, parallel lines, and bus lines for electronic signal transmission.

The database 902 may maintain information related lockers, smart locks, users, and tracking, and the home network server computer (h) 903 processes instructions and data to operate the smart locking management and tracking software for the system. The invention contemplates centrally located computer servers to operate the software modules and database information on the network, but remotely located servers and computer networks can also be accessed and used with the invention.

The home agent 905 on the home network 901 facilitates communications to and from the home network computer server 903. The home network 901 is coupled to a base station transceiver BTS (h) 921 via lines 920 and 919, and the base station transceiver BTS (h) 921 is coupled to a radio transmission unit and antenna 922. That radio transmission unit and antenna 922 facilitates communications to other outside radio transmission units or mobile nodes 923 and supports radio transmission communications links (e.g., Wi-Fi, cellular, Ultra High Frequency (UHF), Global System for Mobile Communications (GSM), Evdo, 4G/LTE, Code-Division Multiple Access (CDMA), or others), to other networks and communication units.

As also shown in FIG. 9, mobile nodes 1-3, which may be mobile phones or similar devices, 913, 915, and 917 are electronically coupled to Radio Frequency readers 914, 916 and 918, respectively. Radio Frequency readers 914, 916 and 918 are part of the access terminal and reader 912 via line 919. Once the mobile nodes 913, 915, and 917 have communicated with the access terminal 912, the entered access credential is verified, as here in FIG. 9 by a local PC 910 via communication line 911, access instructions are sent via communication line 906 through the home network 901 via communication lines 907 and 930 to allow access to the designated locker by opening the associated smart lock. Lockers 931, 933, 935, 937, and 939, receive access instructions via communication lines 932, 934, 936, 938, and 940, respectively. In FIG. 9, locks 937 and 939 have received verified access instructions and the locks have opened. Locks 931, 933 and 935 remain secured. Alternatively, the credentials may be entered remotely by an administrator to allow access to a locker by a user without specific credentials for access.

Figure 10:
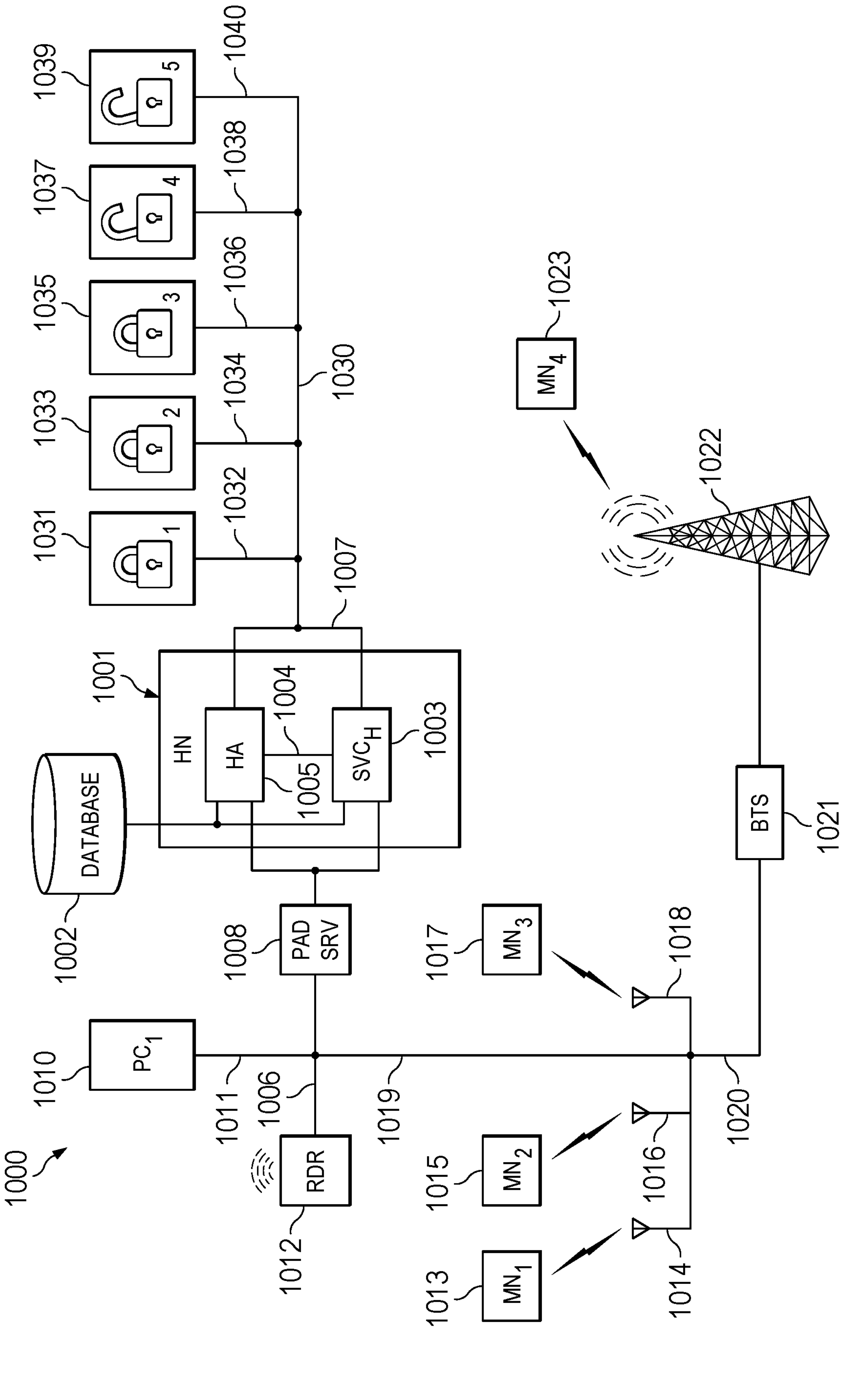

The system of the present invention is also shown by the block diagram in FIG. 10, as a local communication system 1000, or local area network (LAN), supporting the processing communications between a home network 901 and one or more radio frequency receiving smart lock devices 1031, 1033, 1035, 1037, and 1039, where the home network 1001 has a home agent 1005 coupled to a home network computer server(h) (SVR(h)) 1003 by line 1004. The home network computer server(h) 1003 has a gateway server and the home network computer server(h) 1003 is coupled to one or more database memory 1002. A communications link or line is any connection between two or more nodes on a network or users on networks or administrative domains, including serial lines, parallel lines, and bus lines for electronic signal transmission.

The database 1002 may maintain information related lockers, smart locks, users, and tracking, and the home network server computer (h) 1003 processes instructions and data to operate the smart locking management and tracking software for the system. The invention contemplates centrally located computer servers to operate the software modules and database information on the network, but remotely located servers and computer networks can also be accessed and used with the invention.

The home agent 1005 on the home network 1001 facilitates communications to and from the home network computer server 1003. The home network 1001 is coupled to a base station transceiver BTS (h) 1021 via lines 1020 and 1019, and the base station transceiver BTS (h) 1021 is coupled to a radio transmission unit and antenna 1022. That radio transmission unit and antenna 1022 facilitates communications to other outside radio transmission units or mobile nodes 1023 and supports radio transmission communications links (e.g., Wi-Fi, cellular, Ultra High Frequency (UHF), Global System for Mobile Communications (GSM), Evdo, 4G/LTE, Code-Division Multiple Access (CDMA), or others), to other networks and communication units.

As also shown in FIG. 10, mobile nodes 1-3, which may be mobile phones or similar devices, 1013, 1015, and 1017 are electronically coupled to Radio Frequency readers 1014, 1016 and 1018, respectively. Radio Frequency readers 1014, 1016 and 1018 are part of the access terminal and reader 1012 via line 1019. Users may enter access credentials at a pad server 1008 located in proximity to the smart lockers.

Once the mobile nodes 1013, 1015, and 1017 have communicated with the access terminal 1012, the entered access credential is verified, as here in FIG. 10 by a local PC 1010 via communication line 1011, or following entry of access credential at the pad server 1008, access instructions are sent via communication line 1006 through the home network 1001 via communication lines 1007 and 1030 to allow access to the designated locker by opening the associated smart lock. Lockers 1031, 1033, 1035, 1037, and 1039 receive access instructions via communication lines 1032, 1034, 1036, 1038, and 1040, respectively. In FIG. 10, locks 1037 and 1039 have received verified access instructions and the locks have opened. Locks 1031, 1033 and 1035 remain secured.

Figure 11:
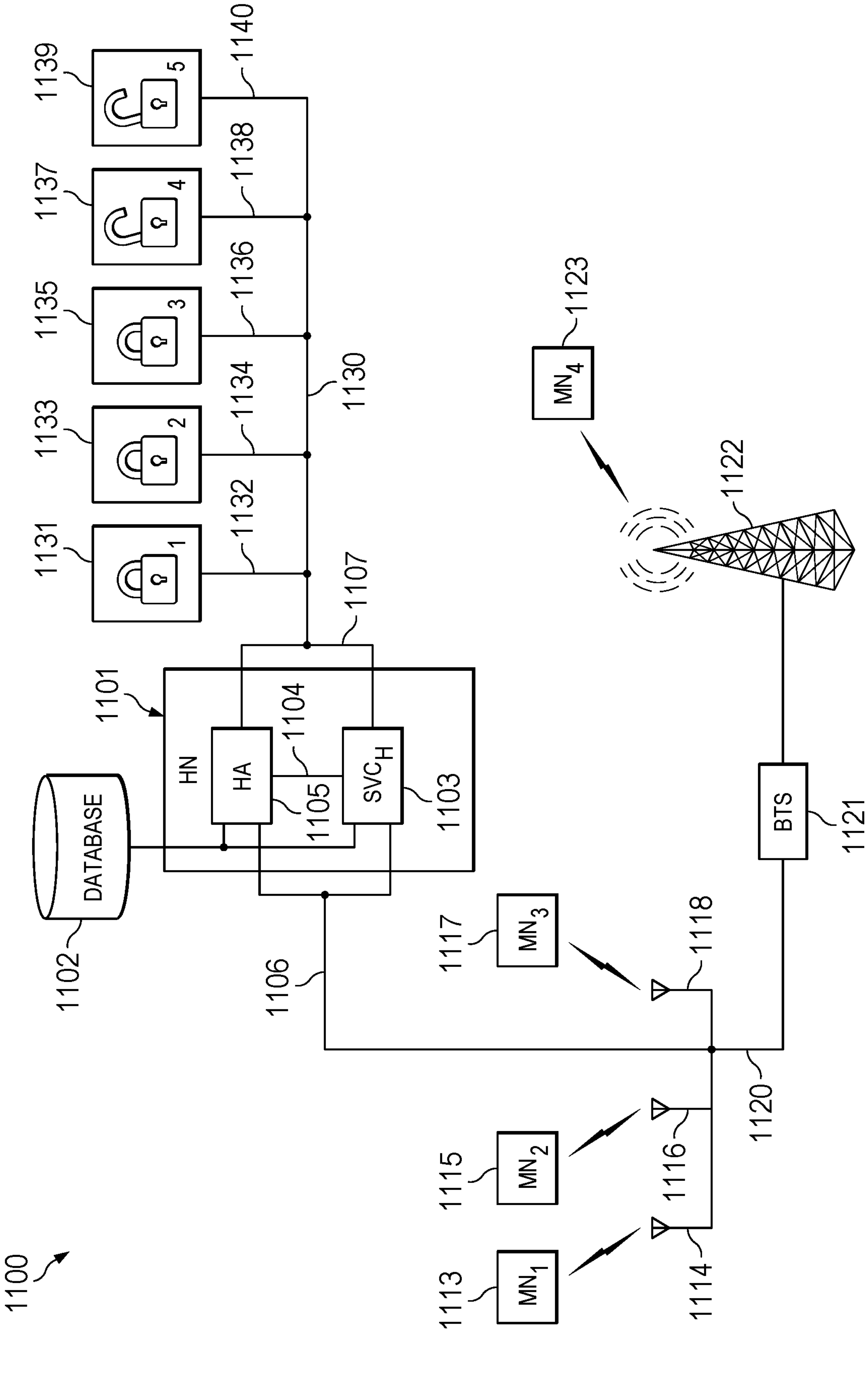

The present invention is also shown by the block diagram in FIG. 11, as a communication system 1100 supporting the processing communications between a home network 1101 and one or more radio frequency receiving smart lock devices 1131, 1133, 1135, 1137, and 1139, where the home network 1101 has a home agent 1105 coupled to a home network computer server(h) (SVR(h)) 1103 by line 1104. The home network computer server(h) 1103 has a gateway server and the home network computer server(h) 1103 is coupled to one or more database memory 1102. A communications link or line is any connection between two or more nodes on a network or users on networks or administrative domains, including serial lines, parallel lines, and bus lines for electronic signal transmission.

The database 1102 may maintain information related lockers, smart locks, users, and tracking, and the home network server computer (h) 1103 processes instructions and data to operate the smart locking management and tracking software for the system. The invention contemplates centrally located computer servers to operate the software modules and database information on the network, but remotely located servers and computer networks can also be accessed and used with the invention.

The home agent 1105 on the home network 1101 facilitates communications to and from the home network computer server 1103. The home network 1101 is coupled to a base station transceiver BTS (h) 1121 via lines 1120 and 1106, and the base station transceiver BTS (h) 1121 is coupled to a radio transmission unit and antenna 1122. That radio transmission unit and antenna 1122 facilitates communications to other outside radio transmission units or mobile nodes 1123 and supports radio transmission communications links (e.g., Wi-Fi, cellular, Ultra High Frequency (UHF), Global System for Mobile Communications (GSM), Evdo, 4G/LTE, Code-Division Multiple Access (CDMA), or others), to other networks and communication units.

In FIG. 11, the system of the present invention is shown without a reader or administrative PC linked to the system. In FIG. 11, mobile nodes 1-3, which may be mobile phones or similar devices, 1113, 1115, and 1117 are electronically coupled to Radio Frequency readers 1114, 1116 and 1118, respectively. Radio Frequency readers 1114, 1116 and 1118 communicate access credential to the home network 1101 via communication line 1106 to gain access to the lockers.

Once the mobile nodes 1113, 1115, and 1117 have communicated access credentials, the entered access credential is verified, access instructions are sent via communication line 1106 through the home network 1101 via communication lines 1107 and 1130 to allow access to the designated locker by opening the associated smart lock. Lockers 1131, 1133, 1135, 1137, and 1139, receive access instructions via communication lines 1132, 1134, 1136, 1138, and 1140, respectively. In FIG. 11, locks 1137 and 1139 have received verified access instructions and the locks have opened. Locks 1131, 1133 and 1135 remain secured.

Figure 12:
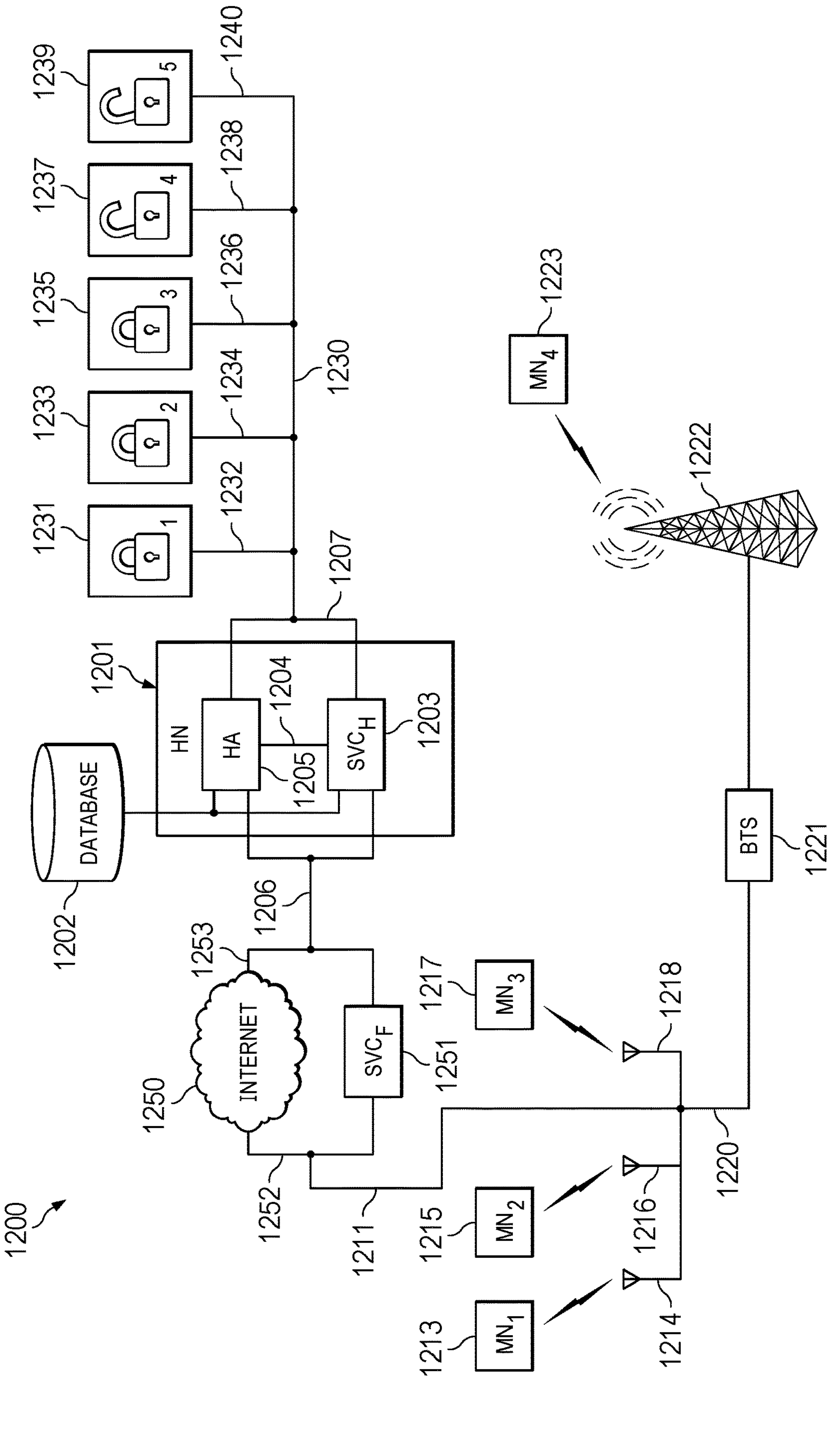

The present invention is also shown by the block diagram in FIG. 12, as a communication system 1100 supporting the processing communications between a home network 1101, a foreign (internet) network 1250 with a foreign server (SVC(f)) 1251, and one or more radio frequency receiving smart lock devices 1231, 1233, 1235, 1237, and 1239, where the home network 1201 has a home agent 1205 coupled to a home network computer server(h) (SVR(h)) 1203 by line 1204. The home network computer server(h) 1203 has a gateway server and the home network computer server(h) 1203 is coupled to one or more database memory 1202. A communications link or line is any connection between two or more nodes on a network or users on networks or administrative domains, including serial lines, parallel lines, and bus lines for electronic signal transmission.

The database 1202 may maintain information related lockers, smart locks, users, and tracking, and the home network server computer (h) 1203 processes instructions and data to operate the smart locking management and tracking software for the system. While the invention contemplates centrally located computer servers to operate the software modules and database information on the local network, in this embodiment, remotely located servers 1251 and computer networks 1250 can also be accessed and used with the invention.

The home agent 1205 on the home network 1201 facilitates communications to and from the home network computer server 1203. The home network 1201 is coupled to a base station transceiver BTS (h) 1221 via lines 1220 and 1206, and the base station transceiver BTS (h) 1221 is coupled to a radio transmission unit and antenna 1222. That radio transmission unit and antenna 1222 facilitates communications to other outside radio transmission units or mobile nodes 1223 and supports radio transmission communications links (e.g. Wi-Fi, cellular, Ultra High Frequency (UHF), Global System for Mobile Communications (GSM), Evdo, 4G/LTE, Code-Division Multiple Access (CDMA), or others), to other networks and communication units.

In FIG. 12, the system is shown with a foreign network (internet) 1250 and foreign server (SVC (f)) 1251 with a foreign gateway server. In FIG. 12, mobile nodes 1-3, which may be mobile phones or similar devices, 1213, 1215, and 1217 are electronically coupled to Radio Frequency readers 1214, 1216 and 1218, respectively. Radio Frequency readers 1214, 1216 and 1218 communicate access credential to the via the internet 1250 by communication lines 1211 and 1252, and from the internet 1250 to the home network 1201 via communication line 1206 to gain access to the lockers.

Once the mobile nodes 1213, 1215, and 1217 have communicated access credentials, the entered access credential is verified, access instructions are sent via the internet 1250 by communication lines 1211 and 1252, and from the internet 1250 via communication line 1253 to the home network 1201. Access is granted from the home network 1201 via communication lines 1206, 1207 and 1230 to allow access to the designated locker by opening the associated smart lock. Lockers 1231, 1233, 1235, 1237, and 1239, receive access instructions via communication lines 1232, 1234, 1236, 1238, and 1240, respectively. In FIG. 12, locks 1237 and 1239 have received verified access instructions and the locks have opened. Locks 1231, 1233 and 1235 remain secured.

In the embodiment illustrated in the figures above, the locker compartments are shown to have doors that are hinged on the right side with the lock installed on the left side of the compartment and wires running vertically through the locker bank. It is understood that the installation of the retrofitted smart lock is substantially the same if the door is hinged on the left side of the compartment with the lock on the right side. The installation would also be substantially the same if the door is hinged on the compartment bottom with the lock on the top, or if the door is hinged on the top with the lock on the compartment bottom. In an embodiment with the door hinged on the top or the bottom, the wiring may be routed vertically as shown in the figures, or the wiring may be routed horizontally and the wireway lock mount installed horizontally over the wiring in the same manner as when placed over vertical wiring.

We claim:

1. A system having a retrofitted locker storage unit with an electronic locking subsystem, comprising:

a locking device that is controlled electronically by one or more signals received from a first processing unit and said locking device being positioned inside said locker storage unit, said first processor receive signals from one or more mobile units to control a locked condition and an unlocked condition associated with the locking device;

a reciprocal locking element positioned inside said locker storage unit and capable of being engaged with the locking device, said locker storage unit placed in the locked condition when the locking device and the reciprocal element are engaged and said locker storage unit placed in the unlocked condition when the locking device and the reciprocal element are disengaged, wherein access to contents in the locker storage unit is permitted when the locking device and the reciprocal element are disengaged and access to the contents in the locker storage unit is prevented when the locking device and the reciprocal element are engaged;

a bracket frame having a length in proportion to one internal dimension of the locker storage unit, said bracket frame having a cavity extending longitudinally along the length of the bracket frame with said cavity being defined between a front panel, a first sidewall panel, a second sidewall panel, a first partial back panel and a second partial back panel;

said front panel being coupled to the first sidewall and the second sidewall, said first sidewall being coupled to said first partial back panel, said second side wall being coupled to said second partial back panel;

an open slot associated with said bracket frame being defined between the first partial back panel and the second partial back panel; and, an aperture on the front panel of said bracket frame, said locking device being positioned proximate to said aperture on the bracket frame;

one or more wire cables extending through the cavity of the bracket frame, said one or more wire cables being coupled to the locking device and providing said one or more signals from said processing unit to electronically control the locked condition and the unlocked condition of the locking device, said locking device receives power from the wire cables located in the cavity of the bracket frame; and, said processing unit is coupled to a radio transceiver system capable of receiving signals in a wireless transmission signal and said first processing unit being coupled to a control panel, said first processing unit receive signals from a wireless transmission to control the locked and unlocked condition associated with the locking device and said first processing unit, in response to the signals received, transmits said one or more signals to said locking device.

2. The system for retrofitting a locker storage unit according to claim 1 wherein said first processing unit is coupled to one or more Internet of things (IoT) sensors.

3. The system for retrofitting a locker storage unit according to claim 1 wherein said first processor receives GPS signals related to a relative position of said one or more mobile units to the locker storage unit.

4. The system for retrofitting a locker storage unit according to claim 1 wherein a keypad coupled to the first processor controls the locked and unlocked condition associated with the locking device.

5. The system for retrofitting a locker storage unit according to claim 1 wherein the locked condition and the unlocked condition is controlled by a physical latching engagement between the locking device and the reciprocal element.

6. The system for retrofitting a locker storage unit according to claim 1 wherein the locked condition and the unlocked condition are controlled by an electromagnetic latching engagement between the locking device and the reciprocal element.

7. A system having an electronic locking subsystem in a locker storage unit, comprising:

a locking device that is controlled electronically by one or more signals received from a first processing unit and said locking device being positioned inside said locker storage unit;

a reciprocal locking element positioned inside said locker storage unit and capable of being engaged with the locking device, said locker storage unit placed in a locked condition when the locking device and the reciprocal element are engaged and said locker storage unit placed in an unlocked condition when the locking device and the reciprocal element are disengaged;

a bracket frame having a length in proportion to one internal dimension of the locker storage unit, said bracket frame having a cavity extending longitudinally along the length of the bracket frame with said cavity being defined between a front panel, a first sidewall panel, a second sidewall panel, a first partial back panel and a second partial back panel, said front panel being coupled to the first sidewall and the second sidewall, said first sidewall being coupled to said first partial back panel, said second side wall being coupled to said second partial back panel;

an open slot associated with said bracket frame being defined between the first partial back panel and the second partial back panel; and, an aperture on the said bracket frame;

one or more wire cables extending through the cavity of the bracket frame, said one or more wire cables being coupled to the locking device and providing said one or more signals from said processing unit to electronically control the locked condition and the unlocked condition of the locking device; and, said first processing unit, in response to a signal received from one or more mobile units, transmits said one or more signals to said locking device, said processing unit is coupled to a radio transceiver system capable of receiving signals in a wireless transmission signal and said first processing unit being coupled to a control panel.

8. The system having an electronic locking subsystem in a locker storage unit according to claim 7 wherein said first processing unit is coupled to one or more Internet of things (IoT) sensors.

9. A system having an electronic locking subsystem in a locker storage unit according to claim 7 wherein said first processor receives signals from said one or more mobile units to control the locked and unlocked condition associated with the locking device.

10. The system having an electronic locking subsystem in a locker storage unit according to claim 7 wherein said first processor receives signals from a wireless transmission to control the locked and unlocked condition associated with the locking device.

11. The system having an electronic locking subsystem in a locker storage unit according to claim 7 wherein said first processor receives GPS signals related to a relative position of said one or more mobile units to the locker storage unit.

12. The system having an electronic locking subsystem in a locker storage unit according to claim 7 wherein a keypad coupled to the first processor controls the locked and unlocked condition associated with the locking device.

13. The system having an electronic locking subsystem in a locker storage unit according to claim 7 wherein the locking device receives power from the wire cables located in the cavity of the bracket frame.

14. The system having an electronic locking subsystem in a locker storage unit according to claim 7 wherein the locking device receives power from one or more batteries located in the locker storage unit.

15. A system for installation of an electronic locking subsystem in a locker storage unit, comprising:

a locking device that is controlled electronically by one or more signals received from a first processing unit and said locking device being positioned inside said locker storage unit;

a reciprocal locking element positioned inside said locker storage unit and capable of being engaged with the locking device, said locker storage unit placed in a locked condition when the locking device and the reciprocal element are engaged and said locker storage unit placed in an unlocked condition when the locking device and the reciprocal element are disengaged;

a bracket frame having a length in proportion to one internal dimension of the locker storage unit, said bracket frame having a cavity extending longitudinally along the length of the bracket frame with said cavity being defined between a front panel, a first sidewall panel, a second sidewall panel, a first partial back panel and a second partial back panel, said front panel being coupled to the first sidewall and the second sidewall, said first sidewall being coupled to said first partial back panel, said second side wall being coupled to said second partial back panel;

an open slot associated with said bracket frame being defined between the first partial back panel and the second partial back panel; and, an aperture on the front panel of said bracket frame, said locking device being positioned proximate to said aperture on the bracket frame;

one or more wire cables extending through the cavity of the bracket frame, said one or more wire cables being coupled to the locking device and providing said one or more signals from said processing unit to electronically control the locked condition and the unlocked condition of the locking device, said locking device receives power from the wire cables located in the cavity of the bracket frame; and, said processing unit is coupled to a radio transceiver system capable of receiving signals in a wireless transmission signal and said first processing unit being coupled to a control panel, said first processing unit receive signals from a wireless transmission to control the locked and unlocked condition associated with the locking device and said first processing unit, in response to the signals received, transmits said one or more signals to said locking device.

16. The system for installation of an electronic locking subsystem in a locker storage unit according to claim 15 wherein said first processing unit is coupled to one or more Internet of things (IoT) sensors.

17. The system for installation of an electronic locking subsystem in a locker storage unit according to claim 15 wherein said first processor receive signals from a wireless transmission to control the locked and unlocked condition associated with the locking device.

18. The system for installation of an electronic locking subsystem in a locker storage unit according to claim 15 wherein said first processor receives GPS signals related to a relative position of one or more mobile units to the locker storage unit.

19. The system for installation of an electronic locking subsystem in a locker storage unit according to claim 15 wherein access to contents in the locker storage unit is permitted when the locking device and the reciprocal element are disengaged.

20. The system for installation of an electronic locking subsystem in a locker storage unit according to claim 15 wherein access to contents in the locker storage unit is prevented when the locking device and the reciprocal element are engaged.

* * * * *